US012557014B2

(12) United States Patent
Asterjadhi et al.

(10) Patent No.: US 12,557,014 B2
(45) Date of Patent: Feb. 17, 2026

(54) TARGET WAKE TIME ALIGNMENT

(71) Applicant: QUALCOMM Incorporated, San Diego, CA (US)

(72) Inventors: Alfred Asterjadhi, San Diego, CA (US); Abdel Karim Ajami, San Diego, CA (US); Abhishek Pramod Patil, San Diego, CA (US); George Cherian, San Diego, CA (US); Sai Yiu Duncan Ho, San Diego, CA (US); Gaurang Naik, San Diego, CA (US); Yanjun Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 404 days.

(21) Appl. No.: 18/180,294

(22) Filed: Mar. 8, 2023

(65) Prior Publication Data

US 2024/0155488 A1    May 9, 2024

Related U.S. Application Data

(60) Provisional application No. 63/382,617, filed on Nov. 7, 2022.

(51) Int. Cl.
*H04W 72/12* (2023.01)
*H04W 52/02* (2009.01)

(52) U.S. Cl.
CPC ....... *H04W 52/0216* (2013.01); *H04W 72/12* (2013.01)

(58) Field of Classification Search
CPC .......................... H04W 52/0216; H04W 72/12
USPC ......................................................... 370/329
See application file for complete search history.

(56) References Cited

U.S. PATENT DOCUMENTS

| | | |
|---|---|---|
| 2021/0007168 A1 | 1/2021 | Asterjadhi et al. |
| 2022/0303907 A1 | 9/2022 | Shafin et al. |

OTHER PUBLICATIONS

International Search Report and Written Opinion—PCT/US2023/074580—ISA/EPO—Feb. 5, 2024.

*Primary Examiner* — Angel T Brockman
(74) *Attorney, Agent, or Firm* — Harrity & Harrity, LLP

(57) ABSTRACT

Various aspects of the present disclosure generally relate to wireless communication. In some aspects, a first wireless device may transmit, to a second wireless device, a request to configure a target wake time (TWT) schedule for a first link associated with the second wireless device, the request including an indication for TWT alignment with a TWT schedule of a second link associated with a third wireless device, the indication for the TWT alignment indicated within a field that is configured to indicate a TWT start time. The first wireless device may receive, from the second wireless device, a response indicating a TWT start time within the field, the TWT start time based at least in part on the indication for TWT alignment with the TWT schedule of the second link. Numerous other aspects are described.

30 Claims, 11 Drawing Sheets

TARGET WAKE TIME ALIGNMENT

CROSS-REFERENCE TO RELATED APPLICATION

This Patent Application claims priority to U.S. Provisional Patent Application No. 63/382,617, filed on Nov. 7, 2022, entitled "TARGET WAKE TIME ALIGNMENT," and assigned to the assignee hereof. The disclosure of the prior Applications is considered part of and is incorporated by reference into this Patent Application.

FIELD OF THE DISCLOSURE

Aspects of the present disclosure generally relate to wireless communication and to techniques and apparatuses for target wake time alignment.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network, may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, an STA may communicate with an associated AP via downlink and uplink. "Downlink" may refer to the communication link from the AP to the station, and "uplink" may refer to the communication link from the station to the AP.

The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (WPAN), which may include a Bluetooth connection, may provide for short range wireless connections between two or more paired wireless devices. For example, wireless devices such as cellular phones may utilize WPAN communications to exchange information such as audio signals with wireless headsets.

SUMMARY

Some aspects described herein relate to a method of wireless communication performed by a first wireless device. The method may include transmitting, to a second wireless device, a request to configure a target wake time (TWT) schedule for a first link associated with the second wireless device, the request including an indication for TWT alignment with a TWT schedule of a second link associated with a third wireless device, the indication for the TWT alignment indicated within a field that is configured to indicate a TWT start time. The method may include receiving, from the second wireless device, a response indicating a TWT start time within the field, the TWT start time based at least in part on the indication for TWT alignment with the TWT schedule of the second link.

Some aspects described herein relate to a method of wireless communication performed by a second wireless device. The method may include receiving a request to configure a TWT schedule for a first link associated with a first wireless device, the request including an indication for TWT alignment with a TWT schedule of a second link associated with the first wireless device and a third wireless device, the indication for the TWT alignment indicated within a field that is configured to indicate a TWT start time. The method may include transmitting a response indicating a TWT start time within the field, the TWT start time based at least in part on the indication for TWT alignment with the TWT schedule of the second link.

Some aspects described herein relate to a first wireless device for wireless communication. The first wireless device may include a memory and one or more processors coupled to the memory. The one or more processors may be configured to transmit, to a second wireless device, a request to configure a TWT schedule for a first link associated with the second wireless device, the request including an indication for TWT alignment with a TWT schedule of a second link associated with a third wireless device, the indication for the TWT alignment indicated within a field that is configured to indicate a TWT start time. The one or more processors may be configured to receive, from the second wireless device, a response indicating a TWT start time within the field, the TWT start time based at least in part on the indication for TWT alignment with the TWT schedule of the second link.

Some aspects described herein relate to a second wireless device for wireless communication. The second wireless device may include a memory and one or more processors coupled to the memory. The one or more processors may be configured to receive a request to configure a TWT schedule for a first link associated with a first wireless device, the request including an indication for TWT alignment with a TWT schedule of a second link associated with the first wireless device and a third wireless device, the indication for the TWT alignment indicated within a field that is configured to indicate a TWT start time. The one or more processors may be configured to transmit a response indicating a TWT start time within the field, the TWT start time based at least in part on the indication for TWT alignment with the TWT schedule of the second link.

Some aspects described herein relate to a non-transitory computer-readable medium that stores a set of instructions for wireless communication by a first wireless device. The set of instructions, when executed by one or more processors of the first wireless device, may cause the first wireless device to transmit, to a second wireless device, a request to configure a TWT schedule for a first link associated with the second wireless device, the request including an indication for TWT alignment with a TWT schedule of a second link associated with a third wireless device, the indication for the TWT alignment indicated within a field that is configured to indicate a TWT start time. The set of instructions, when executed by one or more processors of the first wireless device, may cause the first wireless device to receive, from the second wireless device, a response indicating a TWT start time within the field, the TWT start time based at least in part on the indication for TWT alignment with the TWT schedule of the second link.

Some aspects described herein relate to a non-transitory computer-readable medium that stores a set of instructions for wireless communication by a second wireless device. The set of instructions, when executed by one or more processors of the second wireless device, may cause the second wireless device to receive a request to configure a TWT schedule for a first link associated with a first wireless device, the request including an indication for TWT alignment with a TWT schedule of a second link associated with the first wireless device and a third wireless device, the indication for the TWT alignment indicated within a field that is configured to indicate a TWT start time. The set of instructions, when executed by one or more processors of the second wireless device, may cause the second wireless device to transmit a response indicating a TWT start time within the field, the TWT start time based at least in part on the indication for TWT alignment with the TWT schedule of the second link.

Some aspects described herein relate to an apparatus for wireless communication. The apparatus may include means for transmitting, to a second wireless device, a request to configure a TWT schedule for a first link associated with the second wireless device, the request including an indication for TWT alignment with a TWT schedule of a second link associated with a third wireless device, the indication for the TWT alignment indicated within a field that is configured to indicate a TWT start time. The apparatus may include means for receiving, from the second wireless device, a response indicating a TWT start time within the field, the TWT start time based at least in part on the indication for TWT alignment with the TWT schedule of the second link.

Some aspects described herein relate to an apparatus for wireless communication. The apparatus may include means for receiving a request to configure a TWT schedule for a first link associated with a first wireless device, the request including an indication for TWT alignment with a TWT schedule of a second link associated with the first wireless device and a third wireless device, the indication for the TWT alignment indicated within a field that is configured to indicate a TWT start time. The apparatus may include means for transmitting a response indicating a TWT start time within the field, the TWT start time based at least in part on the indication for TWT alignment with the TWT schedule of the second link.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
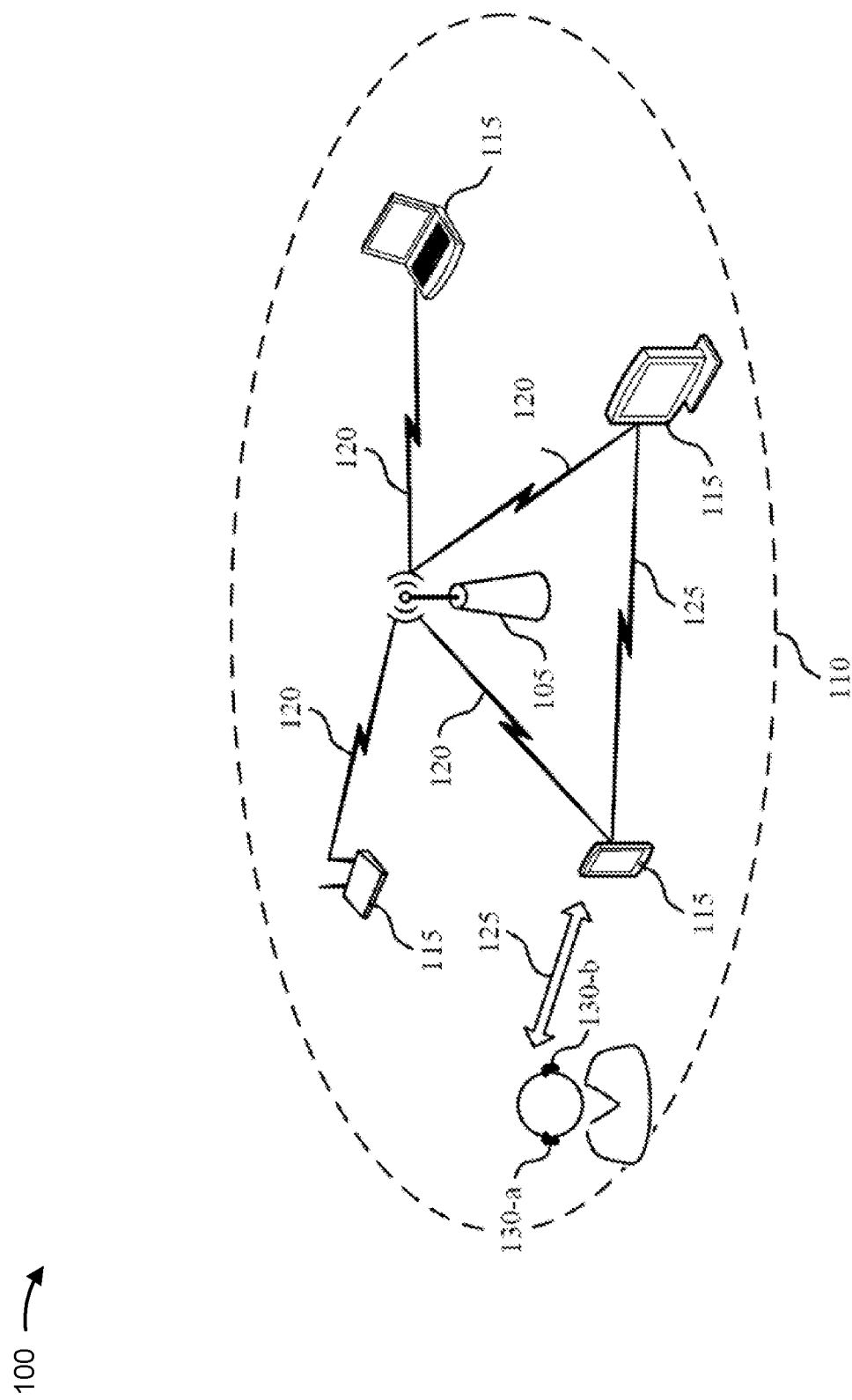
FIG. 1 illustrates a wireless communication system configured in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

In some networks, a wireless communication device (WCD) may support applications associated with low-latency or lossless audio to one or more other devices, such as one or more personal audio devices. For example, a wireless communication device may support applications and use cases associated with ultra-low latency (ULL), such as ULL gaming, or streaming lossless audio to one or more personal audio devices (e.g., peripheral devices) of a user. In scenarios in which a user uses two peripheral devices, the wireless communication device may support an extended personal audio network (XPAN) via which the wireless communication device may communicate with the two peripheral devices. To meet latency or lossless criteria associated with an application or use case, XPAN devices may employ a target wake time (TWT) technique for communication between the wireless communication device and the peripheral devices. In some systems, the peripheral devices and the wireless communication device may exchange one or more Bluetooth messages and implement a complete TWT teardown between the wireless communication device and each of the peripheral devices. Such an exchange of Bluetooth messages and TWT teardown may introduce too much latency for some applications, such as ULL gaming or streaming lossless audio applications.

In some implementations, a wireless communication device (WCD), which may be a handset or an access point (AP) (e.g., a soft AP (SAP)), and a set of peripheral devices (e.g., earbuds or audio devices) may use downlink audio data packets to carry updated TWT parameters or any other XPAN-related parameters that the wireless communication device and the peripheral devices may indicate via wireless signaling. Additionally, or alternatively, the wireless communication device may embed a set of updated parameters in a padding section of an audio data packet and may transmit the audio data packet to the peripheral devices. The peripheral devices may each acknowledge the audio data packet transmitted by the wireless communication device, and the wireless communication device may communicate in accordance with the updated parameters based on receiving acknowledgements from each of the peripheral devices.

FIG. 1 illustrates a wireless communication system 100 (also known as a wireless local area network (WLAN) or a Wi-Fi network) configured in accordance with the present disclosure. The wireless communication system 100 may include an AP 105 and multiple associated devices 115 (such as stations (STAs) or SAPs), which may represent devices such as mobile stations, personal digital assistants (PDAs), other handheld devices, netbooks, notebook computers, tablet computers, laptops, display devices (e.g., TVs, computer monitors, etc.), printers, etc. The AP 105 and the associated devices 115 (e.g., associated STAs) may represent a basic service set (BSS) or an extended service set (ESS). The various devices 115 in the network are able to communicate with one another through the AP 105. Also shown is a coverage area 110 of the AP 105, which may represent a basic service area (BSA) of the wireless communication system 100. An extended network station (not shown) associated with the wireless communication system 100 may be connected to a wired or wireless distribution system that may allow multiple APs 105 to be connected in an ESS.

Although not shown in FIG. 1, a device 115 may be located in an intersection of more than one coverage area 110 and may associate with more than one AP 105. A single AP 105 and an associated set of devices 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The wireless communication system 100 may include APs 105 of different types (e.g., metropolitan area, home network, etc.), with varying and overlapping coverage areas 110. Two devices 115 may also communicate directly via a direct wireless communication link 125 regardless of whether both devices 115 are in the same coverage area 110. Examples of direct wireless communication links 120 may include Wi-Fi Direct connections, Wi-Fi Tunneled Direct Link Setup (TDLS) links, and other group connections. Devices 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within wireless communication system 100.

In some cases, a device 115 (or an AP 105) may be detectable by a central AP 105, but not by other devices 115 in the coverage area 110 of the central AP 105. For example, one device 115 may be at one end of the coverage area 110 of the central AP 105 while another device 115 may be at the other end. Thus, both devices 115 may communicate with the AP 105, but may not receive the transmissions of the other. This may result in colliding transmissions for the two devices 115 in a contention-based environment (e.g., carrier sense multiple access with collision avoidance (CSMA/CA)) because the devices 115 may not refrain from transmitting on top of each other. A device 115 whose transmissions are not identifiable, but that is within the same coverage area 110 may be known as a hidden node. CSMA/CA may be supplemented by the exchange of a request-to-send (RTS) packet transmitted by a sending device 115 (or AP 105) and a clear-to-send (CTS) packet transmitted by the receiving device 115 (or AP 105). This may alert other devices within range of the sender and receiver not to transmit for the duration of the primary transmission. Thus, RTS and/or CTS may help mitigate a hidden node problem.

The wireless communication system 100 may include an AP 105, devices 115 (e.g., which may be referred to as source devices or central devices), and paired devices 115 (e.g., which may be referred to as sink devices or peripheral devices) implementing WLAN communications (e.g., Wi-Fi communications) and/or Bluetooth communications. For example, devices 115 may include cell phones, user equipment (UEs), STAs, mobile stations, PDAs, other handheld devices, netbooks, notebook computers, tablet computers, laptops, or some other suitable terminology. Paired devices 115 may include Bluetooth-enabled devices capable of pairing with other Bluetooth-enabled devices (e.g., such as devices 115), which may include wireless audio devices (e.g., headsets, earbuds, speakers, earpieces, headphones), display devices (e.g., TVs, computer monitors), microphones, meters, valves, etc.

"Bluetooth communications" may refer to a short-range communication protocol and may be used to connect and exchange information between devices 115 and paired devices 115 (e.g., between mobile phones, computers, digital cameras, wireless headsets, speakers, keyboards, mice or other input peripherals, and similar devices). Bluetooth systems (e.g., aspects of wireless communication system 100) may be organized using a central-peripheral relationship employing a time-division duplex protocol having, for example, defined time slots of 625 microseconds, in which transmission alternates between the central device (e.g., a device 115) and one or more peripheral devices (e.g., paired devices 115). In some examples, "device 115" may generally refer to a central device, and "paired device 115" may refer to a peripheral device in the wireless communication system 100. Therefore, in some examples, a device may be referred to as either a device 115 or a paired device 115 based on the Bluetooth role configuration of the device. That is, designation of a device as either a device 115 or a paired device 115 may not necessarily indicate a distinction in device capability, but rather may refer to or indicate roles held by the device in the wireless communication system 100. Generally, "device 115" may refer to a wireless communication device capable of wirelessly exchanging data signals with another device (e.g., a paired device 115), and "paired device 115" may refer to a device operating in a peripheral role, or to a short-range wireless communication device capable of exchanging data signals with the device 115 (e.g., using Bluetooth communication protocols).

A communication link 125 may be established between two Bluetooth-enabled devices (e.g., between a device 115 and a paired device 115) and may provide for communications or services (e.g., according to some Bluetooth profiles). The controller stack may be responsible for setting up communication links 125, such as asynchronous connection-oriented links (or asynchronous connection-oriented connections), synchronous connection-oriented (SCO) links (or SCO connections), extended synchronous connection-oriented (eSCO) links (or eSCO connections), other logical transport channel links, etc. For example, a Bluetooth connection may be an eSCO connection for voice calls (e.g., which may allow for retransmission), an asynchronous connection-less (ACL) connection for music streaming (e.g., advanced audio distribution profile (A2DP)), etc. eSCO packets may be transmitted in predetermined time slots (e.g., 6 Bluetooth slots each for eSCO). The regular interval between the eSCO packets may be specified when the Bluetooth link is established. The eSCO packets to/from a specific device (e.g., paired device 115) are acknowledged and may be retransmitted if not acknowledged during a retransmission window. In addition, audio may be streamed between a device 115 and a paired device 115 using an ACL connection (e.g., an A2DP profile). In some cases, the ACL connection may occupy 1, 3, or 5 Bluetooth slots for data or voice. Other Bluetooth profiles supported by Bluetooth-enabled devices may include Bluetooth Low Energy (BLE) (e.g., providing considerably reduced power consumption and cost while maintaining a similar communication range), human interface device (HID) profile (e.g., providing low latency links with low power requirements), etc.

A device may, in some examples, be capable of both Bluetooth and WLAN communications. For example, WLAN and Bluetooth components may be co-located within a device, such that the device may be capable of communicating according to both Bluetooth and WLAN communication protocols, as each technology may offer different benefits or may improve user experience in different conditions. In some examples, Bluetooth and WLAN communications may share a same medium, such as the same unlicensed frequency medium. In such examples, a device 115 may support WLAN communications via AP 105 (e.g., over communication links 120). The AP 105 and the associated devices 115 may represent a BSS or an ESS. The various devices 115 in the network may be able to communicate with one another through the AP 105. In some cases, the AP 105 may be associated with a coverage area, which may represent a BSA.

Devices 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within system 100, and devices may communicate with each other via communication links 120 (e.g., Wi-Fi Direct connections, Wi-Fi TDLS links, peer-to-peer communication links, or other peer or group connections). AP 105 may be coupled to a network (such as the Internet) and may enable a device 115 to communicate via the network (or communicate with other devices 115 coupled to the AP 105). A device 115 may communicate with a network device bi-directionally. For example, in a WLAN, a device 115 may communicate with an associated AP 105 via downlink (e.g., the communication link from the AP 105 to the device 115) and uplink (e.g., the communication link from the device 115 to the AP 105).

In some examples, content, media, audio, etc. exchanged between a device 115 and a paired device 115 may originate from a WLAN. For example, in some examples, device 115 may receive audio from an AP 105 (e.g., via WLAN communications), and the device 115 may then relay or pass the audio to the paired device 115 (e.g., via Bluetooth communications). In some examples, certain types of Bluetooth communications (e.g., such as high quality or high definition (HD) Bluetooth) may require enhanced quality of service. For example, in some examples, delay-sensitive Bluetooth traffic may have a higher priority than WLAN traffic.

In some deployments, a wireless communication device may support applications associated with low-latency or lossless audio with one or more other devices, such as one or more personal audio devices. For example, a wireless communication device may support applications and use cases associated with ULL, such as ULL gaming, or streaming lossless audio to one or more personal audio devices (e.g., peripheral devices) of a user. In scenarios in which a user uses two peripheral devices (e.g., a wireless earbud 130-a and a wireless earbud 130-b), the wireless communication device may support an XPAN via which the wireless communication device may communicate with the two peripheral devices.

To meet latency or lossless criteria associated with an application or use case, XPAN devices may employ a TWT technique for communication between the wireless communication device and the peripheral devices. Initial or default TWT parameters may be set under an expectation for ideal (e.g., interference-free or approximately interference-free) conditions and may be updated in response to changing channel conditions or a changing concurrency situation at the wireless communication device. In some systems, the peripheral devices and the wireless communication device may exchange one or more Bluetooth messages and implement a complete TWT teardown between the wireless communication device and each of the peripheral devices. Such an exchange of Bluetooth messages and TWT teardown may introduce too much latency for some applications, such as ULL gaming or streaming lossless audio applications.

In some implementations, a wireless communication device, which may be a device 115 (e.g., a handset) or an AP 105, and a set of peripheral devices may use downlink audio data packets to carry updated TWT parameters or any other XPAN-related parameters that the wireless communication device and the peripheral devices may indicate via wireless signaling.

Figure 2:
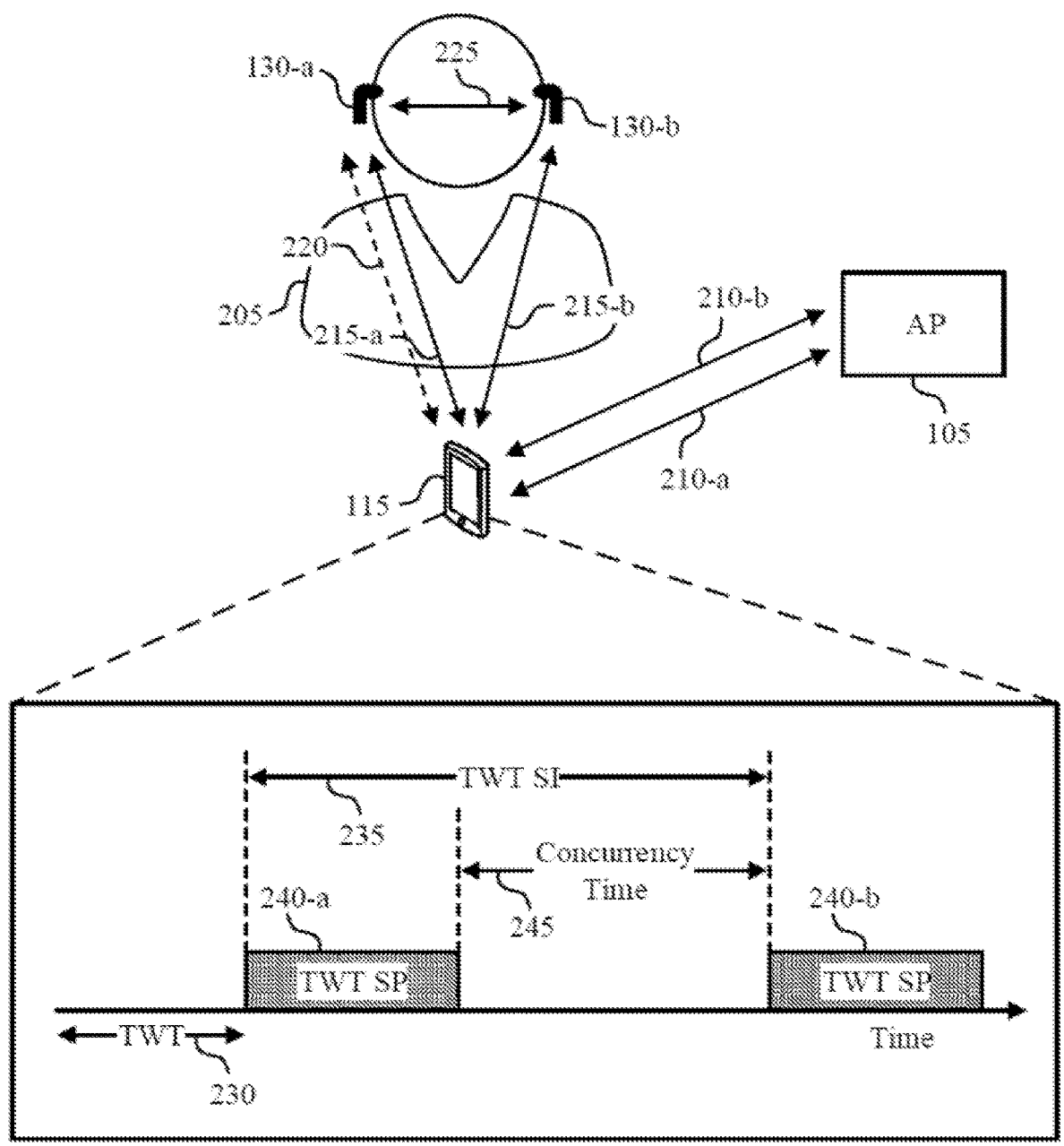
FIG. 2 illustrates an example of a wireless communication system that supports low-latency parameter updates for extended personal audio networks in accordance with the present disclosure.

FIG. 2 illustrates an example of a wireless communication system 200 that supports low-latency parameter updates for extended personal audio networks in accordance with the present disclosure. The wireless communication system 200 may implement or be implemented to realize aspects of the wireless communication system 100. For example, the wireless communication system 200 illustrates communication between an AP 105, a device 115 (e.g., a handset or handheld device), and a wireless earbud 130-a and a wireless earbud 130-b of a user 205 (e.g., examples of audio devices and/or peripheral devices), which may be examples of corresponding devices as illustrated by and described with reference to FIG. 1. In some implementations, the device 115, the wireless earbud 130-a, and the wireless earbud 130-b may support a signaling-based mechanism according to which the device 115 may transmit an indication of a set of updated parameters to each of the wireless earbud 130-a and the wireless earbud 130-b via one or more audio data packets.

In some deployments, the device 115 may communicate with the AP 105 via one or both of a link 210-a and a link 210-b, which may be examples of infrastructure links between the AP 105 and the device 115. The link 210-a may be an example of a 2.4 GHz link between the AP 105 and the device 115, and the link 210-b may be an example of a 5 GHz link or a 6 GHz link between the AP 105 and the device 115. Further, the device 115 may communicate wirelessly with each of the wireless earbud 130-a and the wireless earbud 130-b, where each of the wireless earbud 130-a and the wireless earbud 130-b may be associated with an XPAN of the device 115. For example, the device 115 may communicate with the wireless earbud 130-a via a link 215-a and may communicate with the wireless earbud 130-b via a link 215-b, where the link 215-a and the link 215-b may be referred to or understood as XPAN links. The link 215-a may be an example of a 5 GHz link or a 6 GHz link and the link 215-b may be an example of a 5 GHz link or a 6 GHz link. Additionally, in some examples, the device 115 may communicate with the wireless earbud 130-a, which may be an example of a primary earbud, via a communication link 220. The communication link 220 may be an example of a Bluetooth link between the device 115 and the wireless earbud 130-a. The wireless earbud 130-a and the wireless earbud 130-b, which may be an example of a secondary earbud, may communicate with each other via a link 225, which may be an example of a Bluetooth link between the wireless earbud 130-a and the wireless earbud 130-b.

In some cases, the device 115, the wireless earbud 130-a, and the wireless earbud 130-b may support or belong to an XPAN and may use the XPAN to support one or more applications or use cases, such as applications or use cases associated with latency or lossless audio constraints or criteria. For example, the device 115 may support one or more use cases of ULL gaming and streaming lossless audio to the wireless earbud 130-a and the wireless earbud 130-b (e.g., personal devices of the device 115). For such applications, the device 115 may be expected to keep end-to-end latency below a relatively stringent latency target (e.g., 40 ms for ULL gaming). Further, the device 115 may also be tasked with handling (e.g., gracefully handling) a coexistence of XPAN traffic (e.g., traffic to or from one or both of the wireless earbud 130-a and the wireless earbud 130-b) with other concurrency scenarios that the user 205 or the system may initiate. Such other concurrency scenarios may include a scan concurrency for channel selection, STA infrastructure link concurrency for online gaming or other traffic to or from the AP 105, or neighbor aware networking (NAN) discovery and NAN data transfer, or any combination thereof.

The device 115 may be expected to meet a latency constraint for various applications or use cases (e.g., an ultra-low-latency constraint for a ULL gaming use case) and also facilitate coexistence between XPAN and other concurrency scenarios on the device 115. To meet the latency constraints associated with, for example, ULL gaming, a power constraint of the wireless earbud 130-a and the wireless earbud 130-b, and/or power and concurrency constraints at the device 115, the device 115 may employ a TWT technique for the communication between the device 115 (which may act or function as an SAP) and each of the wireless earbud 130-a and wireless earbud 130-b (which may act or function as STAs).

Example TWT parameters include a TWT 230, a TWT service interval (SI) 235, and a TWT service period (SP) 240. A TWT 230 may indicate or be associated with a timing synchronization function (TSF) time indicating a start or beginning of a first TWT service period. A TWT SI 235 may indicate a TWT interval, which may refer to a time difference between a start or beginning of two consecutive TWT service periods. A TWT SP 240 may indicate a duration during which one or both of the wireless earbud 130-a and the wireless earbud 130-b are awake during a TWT SI 235. In some aspects, a TWT SP 240 may be referred to or understood as a TWT session. As illustrated by FIG. 2, the TWT SI 235 may indicate a time difference between a TWT SP 240-a and a TWT 240-b. A remainder of time within a TWT SI 235 excluding a TWT SP 240 may be referred to or understood as a concurrency time 245 during which the device 115 may perform any operations (e.g., transmission or reception) associated with a concurrency scenario at the device 115. In other words, the difference between XPAN TWT SI 235 and XPAN TWT SP 240 may be the time left for the device 115 to support other concurrencies (e.g., outside of any channel switching or software overheads).

For XPAN, each of the wireless earbud 130-a and the wireless earbud 130-b (which may be examples of TWT requesting STAs) may initiate a TWT session with the device 115 (which may be an example of a TWT responding STA). Further, for low-latency use cases (e.g., ULL gaming use cases), a target end-to-end latency may be relatively stringent (e.g., less than or equal to approximately 40 ms), which may be tied to, associated with, or expect a Wi-Fi latency in a specific range (e.g., in the sub-10 ms range). To achieve such a Wi-Fi latency, a TWT SI 235 and a TWT SP 240 may be selected or set to specific values (e.g., a TWT SI 235 may be set to 4 ms with a TWT SP 240 of 2 ms). Further, for a lossless audio use case, for example, a TWT SI 235 may be set to approximately 70 ms with a TWT SP 240 of approximately 23 ms.

In some cases, a default or initial set of TWT parameters for XPAN may be configured or set expecting ideal (e.g., interference-free or approximately interference-free) conditions (e.g., link conditions, channel conditions, or environmental conditions). In some deployments, Wi-Fi channel conditions, a concurrency situation of the device 115, or XPAN constraints may change over time. Such changes may trigger, be associated with, or mandate a TWT parameter update. Further, in applications or use cases associated with low latency (e.g., ULL gaming and streaming lossless audio), the TWT parameter update may be expected to be performed with low latency, to continue to meet XPAN constraints without compromising a user experience. As an example, for XPAN gaming use cases, a TWT SP 240 may be approximately 2 ms. A communication overhead of the updated TWT parameters, or other information communicated from the device 115 to the wireless earbud 130-a and the wireless earbud 130-b, may also be expected to be relatively small.

In some systems, however, a TWT parameter update procedure may be associated with a relatively high latency. Further, because TWT sessions may be initiated by the wireless earbud 130-a and the wireless earbud 130-b (with default or initial parameters), any update for TWT parameters triggered by a condition change on the device 115 may involve the device 115 transmitting the updated parameters to the wireless earbud 130-a and the wireless earbud 130-b followed by a TWT parameter change at the wireless earbud 130-a and the wireless earbud 130-b.

An example TWT parameter update procedure may include a sequence of signaling steps that involve one or more transmissions using a Bluetooth link, which may introduce relatively large delays. For example, a Wi-Fi sub-system (SS) of the device 115 may send, to a Bluetooth host (BT host) of the device 115, a request (e.g., a TWT parameter update request) to update one or more TWT parameters after one or more conditions are detected that trigger one or more TWT parameter changes. The BT host of the device 115 may communicate an updated set of TWT parameters to a BT host of a primary earbud (e.g., the wireless earbud 130-a) using a Bluetooth link. Such an updated TWT configuration sent via a Bluetooth link may add approximately 80 ms of delay. The BT host of the primary earbud may signal the new TWT parameters internally to a Wi-Fi SS of the primary earbud, and the BT host of the primary earbud may communicate the new TWT parameters to a BT host of a secondary earbud (e.g., the wireless earbud 130-b) using a Bluetooth link. Such an indication of a TWT configuration via a Bluetooth link between the primary earbud and the secondary earbud may add approximately 120 ms of delay. The BT host of the secondary earbud may signal the new TWT parameters internally to a Wi-Fi SS of the secondary earbud.

The Wi-Fi SS of the primary earbud may start a TWT session teardown and parameter update process. The TWT session teardown and parameter update process may involve a transmission, from the Wi-Fi SS of the primary earbud to the Wi-Fi SS of the device 115 via an XPAN Wi-Fi link, of a TWT Teardown message and a TWT Request message that carries the new TWT parameters, and a transmission, from the Wi-Fi SS of the device 115 to the Wi-Fi SS of the primary earbud via the XPAN Wi-Fi link, of an acknowledgement (ACK) of the new TWT parameters with a TWT Response message. The Wi-Fi SS of the device 115 may update the BT host of the device 115 that a new TWT session with the primary earbud has been established (e.g., the Wi-Fi SS may indicate a TWT session update to the BT host). Such a TWT session teardown and parameter update process may additionally be performed between the device 115 and the secondary earbud.

Figure 3:
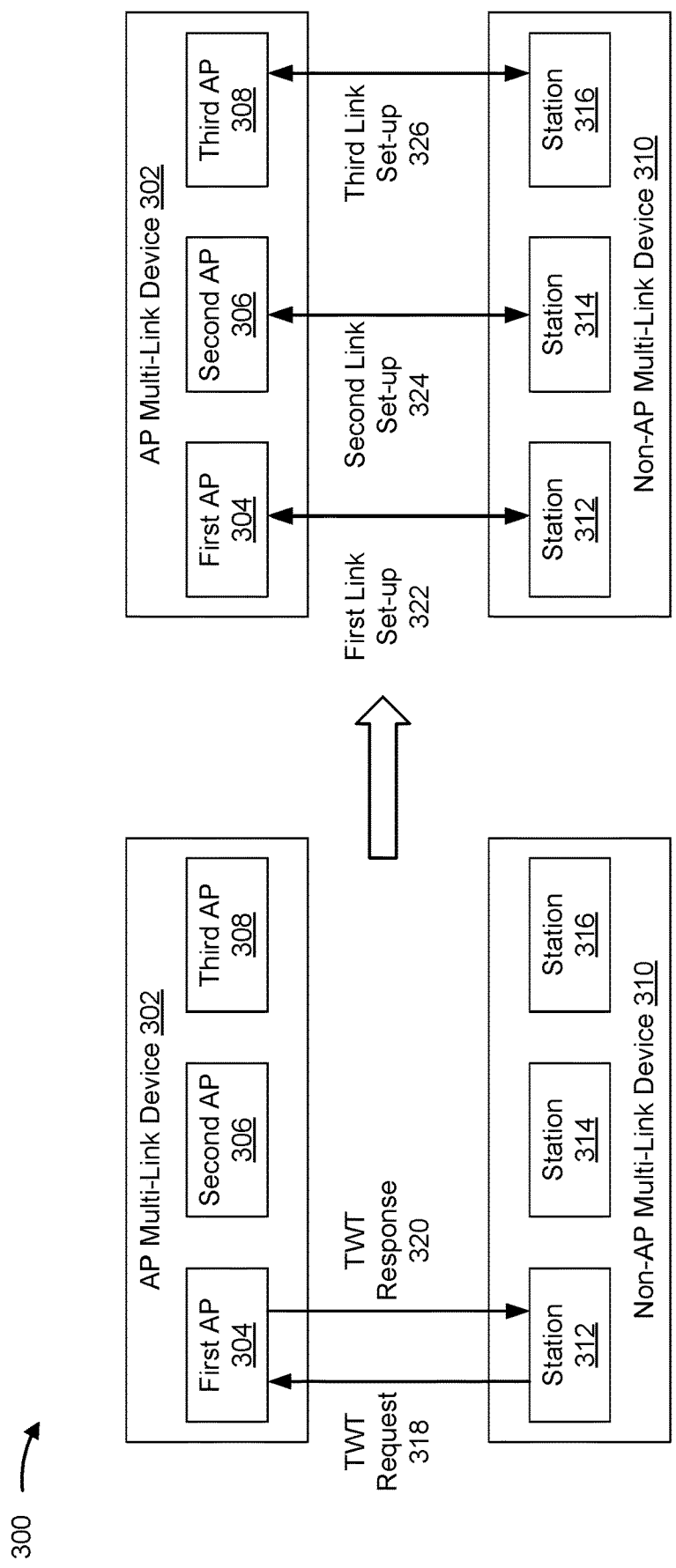
FIG. 3 is an example of a link set up procedure for multi-link devices (MLDs).

FIG. 3 is an example 300 of a link set up procedure for multi-link devices. As shown in FIG. 3, an access point (AP) multi-link device (MLD) 302 may establish multiple links with a non-AP MLD. The multiple links may be associated with different frequency bands.

As shown in FIG. 3, an AP multi-link device 302 may include, or may be associated with, a first AP 304, a second AP 306, and a third AP 308. A non-AP multi-link device 310 may include, or may be associated with, a station 312, a station 314, and a station 316. The station 312 may transmit a TWT request 318 that requests for the AP MLD 302 to set up TWT sessions between the first AP 304, the second AP 306, and the third AP 308 with the station 312, station the 314, and the station 316. For example, the TWT request 318 may include a bitmap that indicates a request to set up TWT sessions on the links of each of the station 312, the station 314, and the station 316. The bitmap may be associated with different frequency bands that are associated with the different links on which the stations operate.

The first AP 304 may transmit a TWT response 320 that indicates an initiation of setup procedures for each of the station 312, the station 314 and the station 316. Based at least in part on the first AP 304 transmitting the TWT response 320, the AP MLD 302 and the non-AP MLD 310 may have previously performed link setup procedures and subsequently perform TWT setups with each of the station 312, the station 314 and the station 316. For example, the first AP 304 and the station 312 may perform a first TWT setup 322, the second AP 306 and the station 314 may perform a second TWT setup 324, and the third AP 308 and the station 316 may perform a third TWT setup 326.

As indicated above, FIG. 3 is provided as an example. Other examples may differ from what is described with respect to FIG. 3.

Figure 4:
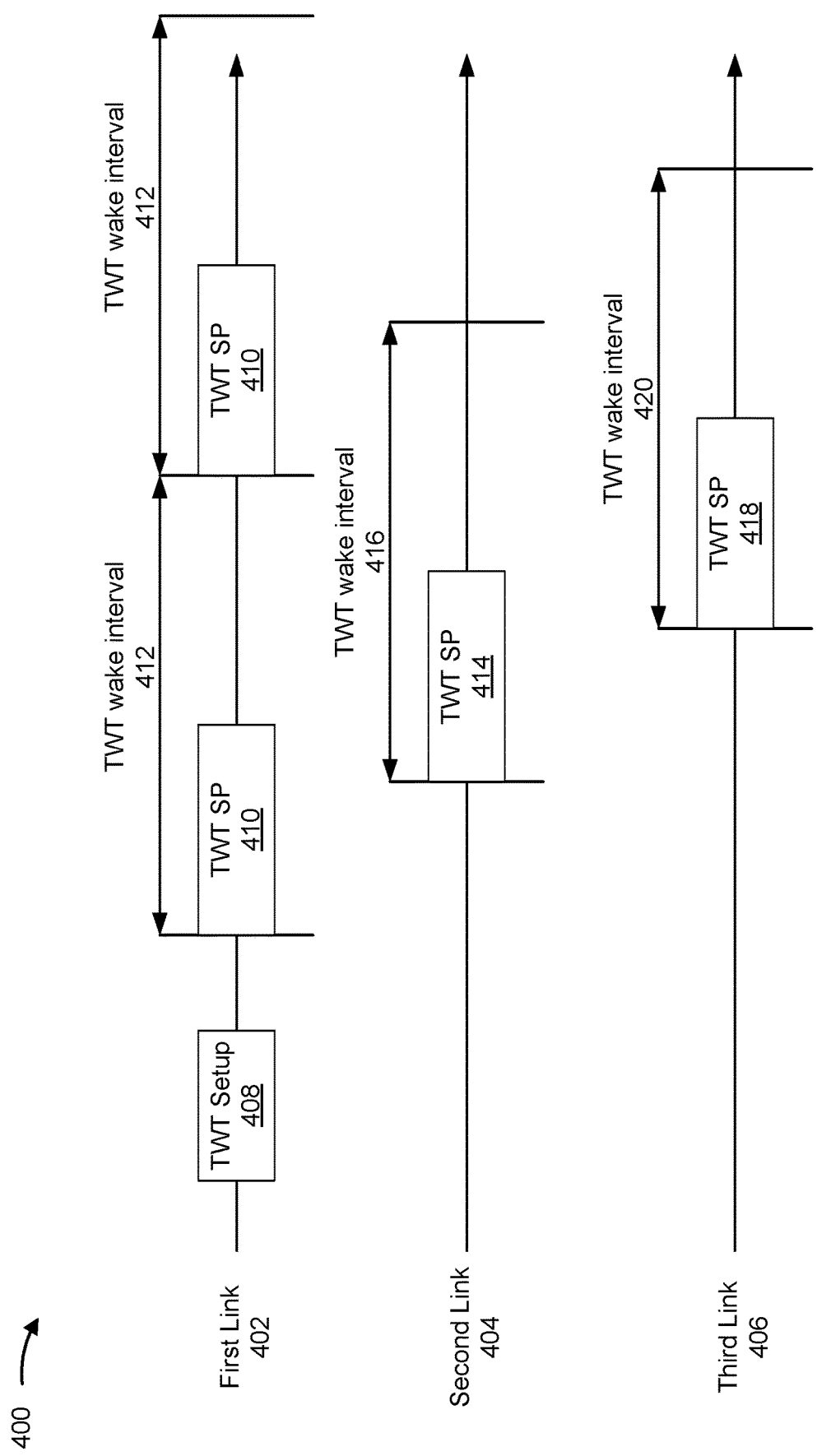
FIG. 4 is an example of a configuration of multi-link communications by MLDs.

FIG. 4 is an example 400 of a configuration of multi-link communications by MLDs. As shown in FIG. 4, an AP MLD may communication via multiple links with a non-AP MLD. The multiple links may be associated with different frequency bands.

As shown in FIG. 4, the AP MLD may communicate with the non-AP MLD via a first link 402, a second link 404, and a third link 406. The first link 402 may be associated with a link between a first STA of the non-AP MLD and a first wireless device of the AP MLD. Similarly, the second link 404 may be associated with a link between a second STA of the non-AP MLD and a second wireless device of the AP MLD, and the third link 406 may be associated with a link between a third STA of the non-AP MLD and a third wireless device of the AP MLD.

The non-AP STA and the AP may perform TWT setup 408. The TWT setup 408 may include a cross-link TWT signaling mechanism to support negotiation of multiple TWT agreements associated with the links 402, 404, and 406. However, the TWT setup 408 may include independent setup of the multiple TWT agreements, where timing of the first link 402 (e.g., a TWT start time, a TWT wake interval, and/or a TWT service period duration) is configured without consideration of timing of the second link 404 or the third link 406.

As shown in FIG. 4, the first link 402 may be configured with a TWT service period (SP) 410 and a TWT wake interval 412. The TWT SP 410 may be configured to begin at a start time of the TWT wake interval 412. Similarly, the second link 404 may be configured with a TWT SP 414 and a TWT wake interval 416 and the third link 406 may be configured with a TWT SP 418 and a TWT wake interval 420.

As shown in FIG. 4, based at least in part on TWT timing of the first link 402, the second link 404, and the third link 406 being unaligned, the non-AP MLD and the AP MLD may have an active TWT SP for at least one of the links during an extended amount of time relative to an SP of any one of the links. In this way, the first wireless device may consume power resources that may have otherwise been conserved if the TWT SPs were aligned (e.g., start times of the TWTs were aligned). This is based at least in part on the non-AP MLD and the AP MLD maintaining an active transmission and/or reception chain during the TWT SPs for all of the links.

As indicated above, FIG. 4 is provided as an example. Other examples may differ from what is described with respect to FIG. 4.

In some aspects described herein, a first wireless device (e.g., an STA and/or a non-AP MLD) may transmit a request to configure a TWT schedule for a first link associated with a second wireless device. In some aspects, the request to configure the TWT schedule for the first link may include an indication (e.g., a request) for TWT alignment with a TWT schedule of a second link associated with a third wireless device. In some aspects, the indication for TWT alignment with the TWT schedule of the second link may indicated within a field that is configured to indicate a TWT start time.

The second wireless device may receive the request and may configure the TWT schedule of the first link for time alignment with the TWT schedule of the second link. In some aspects, the second wireless device and the third wireless device may be APs associated with an AP MLD. In some aspects, the third wireless device may be a same device as the second wireless device.

In some aspects, the first wireless device may transmit the indication within a TWT request with an explicit request for MLD alignment. For example, a TWT request frame sent by the first wireless device (e.g., a non-AP STA of an MLD) includes two or more TWT IEs where a setup command field (e.g., TWT Setup Command field) of all of the TWT elements indicates to request a TWT (e.g., Request TWT). In some aspects, no mixing of commands may be allowed (e.g., from a perspective of a communication protocol) in the same request frame.

Each bitmap field of a link identification (e.g., Link ID Bitmap field) contained in the TWT element has only one bit set to 1, and a nonzero bit cannot appear more than once unless a range of TWT parameters is being provided for that particular link. These are links for which the TWT alignment is requested by the first wireless device (e.g., a first STA) affiliated with a non-AP MLD.

Each TWT field of TWT IEs may be in reference to a timing synchronization function (TSF) time of an associated link indicated by the Link ID Bitmap field of the TWT IE. In this way, the first wireless device may indicate a specific first TWT. Alternatively, the first wireless device may indicate an MLD alignment request using any nonzero TWT value. In some aspects, when a TWT value is set to zero, the TWT value indicates that the first wireless device does not request timing alignment.

In some aspects, APs of the AP MLD may transmit beacons (e.g., periodically) or other information that provides connection and/or synchronization information associated with the APs. For example, a beacon may include a time stamp that indicates an absolute time, in a domain of an associated AP, associated with transmission of the beacon. In this way, the first wireless device may identify an absolute time of the AP and may identify a desired TWT schedule in the domain of the associated AP. For example, different STAs of the first wireless device may obtain information from associated beacons and share the information with the first wireless device (e.g., an STA associated with the first link). In some aspects, the APs may be aware of absolute times of others of the APs based at least in part on being affiliated (e.g., affiliated with an AP MLD).

In some aspects, the STAs affiliated with the non-AP MLD may coordinate to request that all TWTs have a same global start time (e.g., independent from domains of the APs); however, the TWTs are requested with reference to the timestamps of each of the APs operating in those links. In some aspects the TWT wake intervals, which are specified by the TWT Wake Interval Mantissa & TWT Wake Interval Exponent fields of the TWT elements, may be equal (e.g., within a threshold difference) across TWT IEs.

In some aspects, TWT wake intervals may be multiples of a common denominator instead of aligning at the start of each TWT wake interval for both of the links. For example, a first link may have a TWT wake interval that is 2 times (×) a TWT wake interval of a second link. Additionally, or alternatively, a third link may have a TWT wake interval that is 3× the TWT wake interval of the second link. In this way, each of the links will have a common TWT start time every six TWT wake intervals of the second link.

In some aspects, a communication protocol may allow a nonzero TWT field in a TWT request frame with a TWT Setup Command that indicates a Request TWT. In some aspects, the nonzero TWT field may indicate a TSF time at which the first wireless device requests for a first TWT start time (e.g., to cause global start time alignment with one or more additional TWT start times of other links).

In some aspects, the communication protocol may require TWT wake intervals across the links to be a multiple of a common denominator. In some aspects, the multiple may be limited in size to increase a frequency of time alignment. For example, the multiple may be limited to 4, 6, 8, or 12, among other examples. In some aspects, other values for TWT parameters (e.g., TWT SP duration) may be dependent on a link configuration.

In some aspects, the second device (e.g., an AP associated with an AP MLD) may respond to the TWT request that indicates time alignment with the second link. In some aspects, a TWT request frame sent by a non-AP STA includes at least two TWT IEs where TWT Setup Commands of all of the TWT IEs indicate a Request TWT and nonzero TWT fields. Based at least in part on these TWT request frames, the second device (e.g., the AP) may respond with a TWT response frame that includes a same number of TWT IEs with a TWT Setup Command that indicates either Accept TWT or Reject TWT. In some aspects, each Link ID Bitmap of the TWT IEs has only one bit equal to 1 (e.g., as with a TWT request).

In some aspects, no TWT agreement exists for links identified in a Link ID Bitmap within a TWT IE with Reject TWT, and a TWT agreement exists for links identified in a Link ID Bitmap within a TWT IE with Accept TWT. In some aspects, the TWT agreement may use TWT parameters identified in the TWT response frame.

Each TWT IE with Accept TWT may indicate TWT parameters, such as TWT fields of the TWT IEs in reference to the TSF time of the link identified in the TWT IE, with TWT fields across the links pointing to the same global start time. In some aspects, TWT Wake Interval mantissa and TWT Wake Interval exponent field may be equal (e.g., within a threshold difference) for all of the TWT IEs requested for alignment. In some aspects, the TWT Wake Interval mantissa and TWT Wake Interval exponent field may be related based at least in part on having a common denominator (e.g., being a multiple of the common denominator).

In some aspects, a communication protocol may require TWT fields of TWT IEs with Accept TWT to point to the same global start time. The values may be in reference to TSF times of the links identified in the respective TWT IEs. TWT fields that point to future TWTs may be used (e.g., multiples of the TWT Wake interval) to account for intra-AP delays.

In some aspects, TWT request and TWT response frames negotiating broadcast TWTs (e.g., B-TWTs) may include one or more TWT IEs, and follow similar rules to an Individual-TWT (I-TWT) case, with one or more modifications. For example, a B-TWT IE may include one or more B-TWT parameter sets, with the TWT field pointing to a partial TSF time (e.g., a time relative to a start-up of an associated AP or a rest time at which the AP TSF time returns to zero) rather than a global TSF time. In some aspects, this may be based at least in part on the TWT field being only 2 octets long. In some aspects, resolution of these TWTs may be 1 time unit (TU), hence alignment across links is at a 1 TU level of granularity. In some aspects, the TWT wake intervals may be configured to be multiples of 1 TU in addition to being multiples of a common denominator. Additionally, or alternatively, one or more constraints associated with IEs may be applied at a B-TWT Parameter Set level as opposed to the IE level.

Based at least in part on TWT timing alignment of multiple links between the first wireless device and the second wireless device (e.g., an AP MLD), the first wireless device and the second wireless device may reduce an amount of time during which the first wireless device has an active TWT SP for at least one of the links. In this way, the first wireless device may conserve power resources that may have otherwise been consumed if the TWT SPs were not aligned.

As indicated above, FIG. 4 is provided as an example. Other examples may differ from what is described with respect to FIG. 4.

Figure 5:
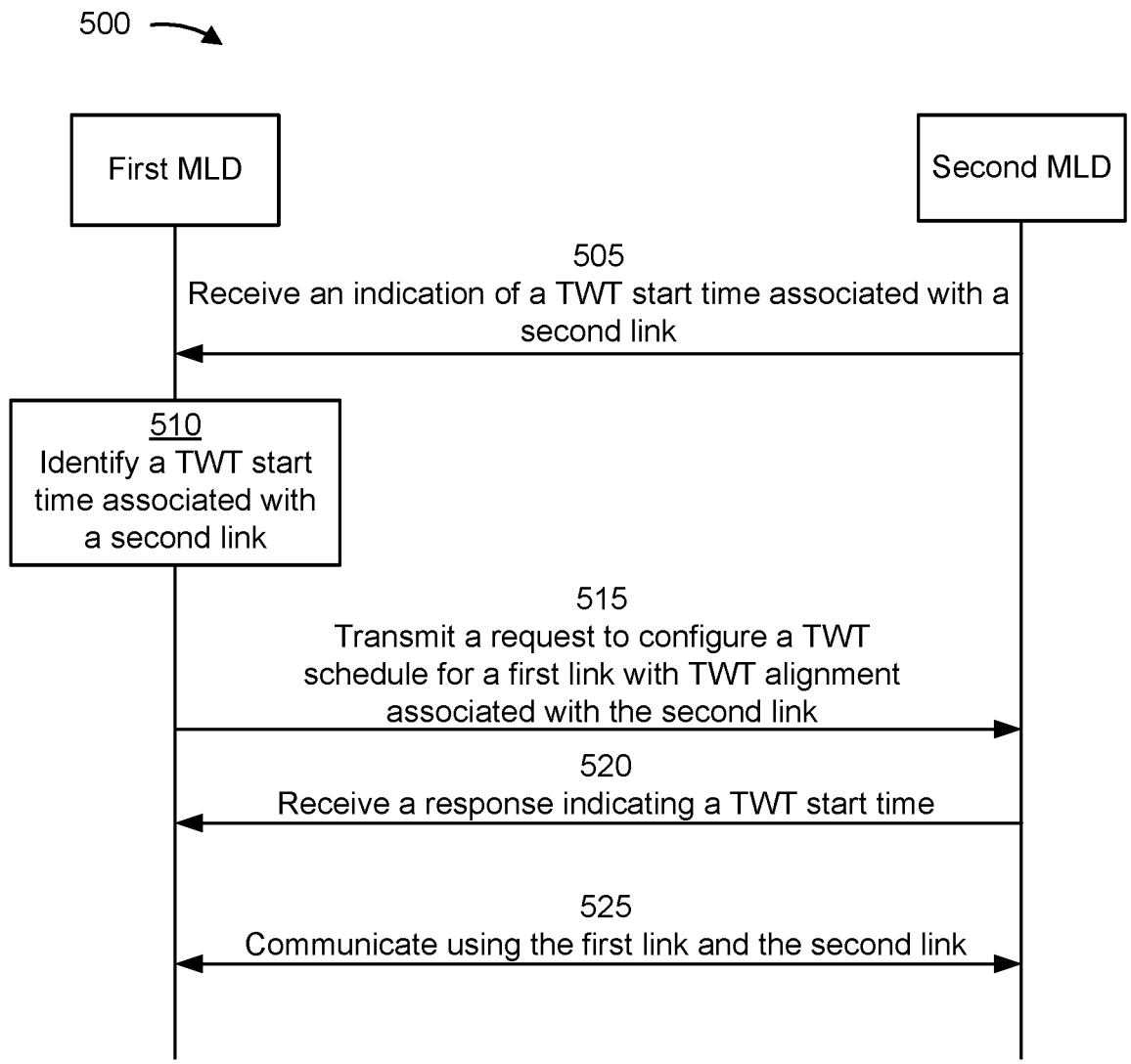
FIG. 5 is a diagram of an example associated with TWT alignment, in accordance with the present disclosure.

FIG. 5 is a diagram of an example 500 associated with TWT alignment, in accordance with the present disclosure. As shown in FIG. 5, a first MLD (e.g., one or more STAs associated with the first MLD) may communicate with a second MLD (e.g., one or more APs). In some aspects, the first MLD and the second MLD may be part of a wireless network (e.g., wireless communication system 100). The first MLD and the second MLD may have established a wireless connection (e.g., via one or more links using one or more pairs of STAs and APs) prior to operations shown in FIG. 5. The first MLD or an STA of the first MLD may be referred to as a first wireless device. The second MLD or an AP of the second MLD may be referred to as a second wireless device.

As shown by reference number 505, the first MLD may receive, and the second MLD may transmit, an indication of a TWT start time associated with a second link. For example, an STA of the first MLD may receive a communication from an AP of the second MLD associated with the second link. In some aspects, the second link may be a link between the first MLD (e.g., a second STA of the first MLD) and a wireless device (e.g., a second AP of the second MLD).

As shown by reference number 510, the first MLD may identify a TWT start time associated with the second link. In some aspects, the first MLD may identify the TWT start time associated with the second link based at least in part on receiving the indication as described in connection with reference number 505. In some aspects, the first MLD may identify the TWT start time associated with the second link independently from (e.g., in absence of) receiving the indication, as described in connection with reference number 505.

In some aspects, the first MLD may identify the TWT start time associated with the second link based at least in part on receiving a beacon broadcast by an AP associated with the second link. In some aspects, the first MLD may identify the TWT start time associated with the second link based at least in part on a time stamp of the beacon. In some aspects, the TWT start time associated with the second link may be a requested TWT start time associated with the second link, as identified in a time domain of the AP associated with the second link.

As shown by reference number 515, the first MLD may transmit a request to configure a TWT schedule for a first link with TWT alignment associated with the second link. For example, the first MLD may transmit the request including an indication for TWT alignment with a TWT schedule of the second link. In some aspects, the indication for the TWT alignment may be indicated within a field that is configured to indicate a TWT start time. In some aspects, the indication for the TWT alignment may include, within the field that is configured to indicate the TWT start time, a non-zero value or an indication of a requested TWT start time for the first link.

In some aspects, the request to configure the TWT schedule with alignment associated with the second link may indicate a request to be aligned with the second link. In some aspects, the request to configure the TWT schedule with alignment associated with the second link may indicate a TWT start time and/or periodicity requested for the first link based at least in part on identification of the TWT start time associated with the second link as indicated in connection with reference number 510.

In some aspects, the request to configure the TWT schedule with alignment associated with the second link may indicate a TWT start time and/or periodicity requested for the first link based at least in part on the TWT start time and/or periodicity being aligned with a requested TWT start time and/or periodicity associated with the second link. For example, the first MLD may transmit the request to configure the TWT schedule for the first link along with a request to configure a TWT schedule for the second link, with an indication to align the TWT start times of the first link and the second link. In some aspects, the request to align the start times of the first link and the second link may include an indication of a first start time for the first link in a time domain of a first AP (e.g., of the second MLD) associated with the first link, and an indication of a second start time for the second link in a time domain of a second AP (e.g., of the second MLD) associated with the second link. In some aspects, an absolute time in the time domain of the first AP satisfies a threshold relative to the TWT start time, associated with the second link, associated with a time in a time domain of the second AP.

In some aspects, a difference in time between the requested TWT start time and the TWT start time associated with the second link may satisfy a threshold. For example, the difference in time may be less than or equal to an alignment threshold such that the TWT start times are substantially equal in a global time domain (e.g., possibly different in local time domains of APs associated with the first link or the second link).

In some aspects, TWT alignment includes satisfaction of a first threshold by a first difference in time between the TWT start time associated with the first link and a TWT start time associated with the second link. In some aspects, TWT alignment includes satisfaction of a second threshold by a second difference in time between the TWT start time and a subsequent TWT start time associated with a subsequent TWT period associated with the second link. For example, the TWT start time of the first link may have timing alignment with a subsequent TWT start time, but not all TWT start times, associated with the second link. In some aspects, the periodicities and/or TWT wake times may have durations that are multiples of a common denominator. For example, a first periodicity may be 12 TUs and a second periodicity may be 8 TUs, with a common denominator of 4. In some aspects, the multiples may be limited in size (e.g., less than 10). In some aspects, TWT alignment includes satisfaction of a third threshold by a third difference in time between a subsequent TWT start time associated with a subsequent TWT period associated with the first link and the TWT start time associated with the second link. In some aspects, TWT alignment includes satisfaction of a fourth threshold by a fourth difference between a first TWT wake interval mantissa and a first exponent field of the first link, and a second TWT wake interval mantissa and a second exponent field of the second link.

In some aspects, TWT alignment includes a time offset between occasions of the TWT start time and occasions of an additional start time associated with the second link. In some aspects, the time offset may be based at least in part on a TWT service period associated with the first TWT schedule (e.g., with an offset configured to start a second TWT start time of the second link after completion of a TWT SP of a first TWT wake interval of the first link). For example, the first link may be TWT aligned with the second link to avoid or reduce simultaneous TWT SPs. In some aspects, the first MLD may be configured to communicate via only one link at a time (e.g., based at least in part on hardware or other resource limitations). In this way, the first MLD may be able to hop between links during concurrency times of other links, with non-overlapping TWT SPs.

In some aspects, timing alignment includes satisfaction of a threshold by a first difference in time between a first TWT periodicity of the first link and a second TWT periodicity of the second link. In some aspects, timing alignment includes satisfaction of a threshold by a second difference in time between a multiple of the first TWT periodicity of the first link and the second TWT periodicity of the second link. In some aspects, timing alignment includes satisfaction of a threshold by a third difference in time between the first TWT periodicity of the first link and a multiple of the second TWT periodicity of the second link.

As shown by reference number 520, the first MLD may receive, and the second MLD may transmit, a response indicating a TWT start time associated with the first link. In some aspects, the TWT start time may be based at least in part on the indication for TWT alignment with the TWT schedule of the second link. For example, the second MLD may transmit an indication of acceptance of a requested start time as indicated in the request to configure the TWT schedule for the first link with the TWT alignment associated with the second link, as described in connection with reference number 515. In some aspects, the indication of the TWT start time may be in a same field of the response as the indication of alignment with the second link in the request to configure the TWT schedule for the first link (e.g., a TWT start time field).

In some aspects, the response indicating the TWT start time within the field indicates a TWT start time as identified by the second MLD (e.g., the first AP) as satisfying a first threshold relative to the TWT start time associated with the second link, the requested TWT start time (e.g., a confirmation of the requested start time), or the TWT start time as identified by the second MLD (e.g., the first AP) as satisfying a second threshold relative to the requested TWT start time.

In some aspects, the first service period duration of the first link is independent from the second service period duration of the second link. In some aspects, the TWT start time is an absolute time (e.g., relative to a start-up time of the second wireless device). In some aspects, the TWT start time is relative to a start-up time or a reference time in a time domain of the second wireless device (e.g., a partial time stamp). In some aspects, the TWT start time is relative to the reference time based at least in part on a number of bits available to indicate the TWT start time. For example, if a TWT field includes two octets, the field configured to indicate the TWT start time may indicate a selection of one of $2^{16}$ TUs. If a TU is 1 second, the TWT field can only indicate a TWT start time with a unique value of the field for about 18 hours and 12 minutes. To support an indication on a subsequent day or after an amount of time associated with a maximum number of unique values of the field, the TWT field may indicate a TWT start time relative to a reference time (e.g., relative to a maximum value of the TWT start time field, relative to a relative to a start of a day, or relative to a time in the time domain of the second wireless device, among other examples).

A reset time may be used instead of a start-up time. The reset time may be a time at which the time in the time domain of the second wireless device resets to zero based at least in part on reaching a maximum time in a time counter. In some aspects, the first link and/or the second link is associated with a broadcast TWT.

In some aspects, the second MLD may transmit the response indicating the start time (e.g., a first start time associated with the first link) based at least in part on receiving the request to configure the TWT schedule for the first link. In some aspects, the second MLD may transmit the response indicating the start time independently from (e.g., in the absence of) receiving the request to configure the TWT schedule for the first link. For example, the second MLD may transmit the response indicating the start time as, or included in, an individually addressed solicited response, a solicited response based at least in part on reception of a request to configure a TWT schedule for the first link, and/or a broadcast response, among other examples.

As shown by reference number 525, the first MLD and the second MLD may communicate using the first link and the second link. For example, the first MLD and the second MLD may communicate with time alignment (also referred to as "timing alignment" of the first link and the second link. In some aspects, the first MLD may communicate with the second wireless device via the first link using the first TWT start time in the first link and/or using the second TWT start time in the second link. In some aspects, the first MLD may initiate a TWT teardown of one or more of the first TWT schedule or the second TWT schedule based at least in part on receiving the response. For example, the first MLD may initiate the TWT teardown to reset a configuration of the first link or the second link.

Based at least in part on TWT timing alignment of multiple links between the first MLD (e.g., a first wireless device) and the second MLD (e.g., a second wireless device), the first MLD and the second MLD may reduce an amount of time during which the first MLD has an active TWT SP for at least one of the links. In this way, the first MLD may conserve power resources that may have otherwise been consumed if the TWT SPs were not aligned.

As indicated above, FIG. 5 is provided as an example. Other examples may differ from what is described with respect to FIG. 5.

Figure 6:
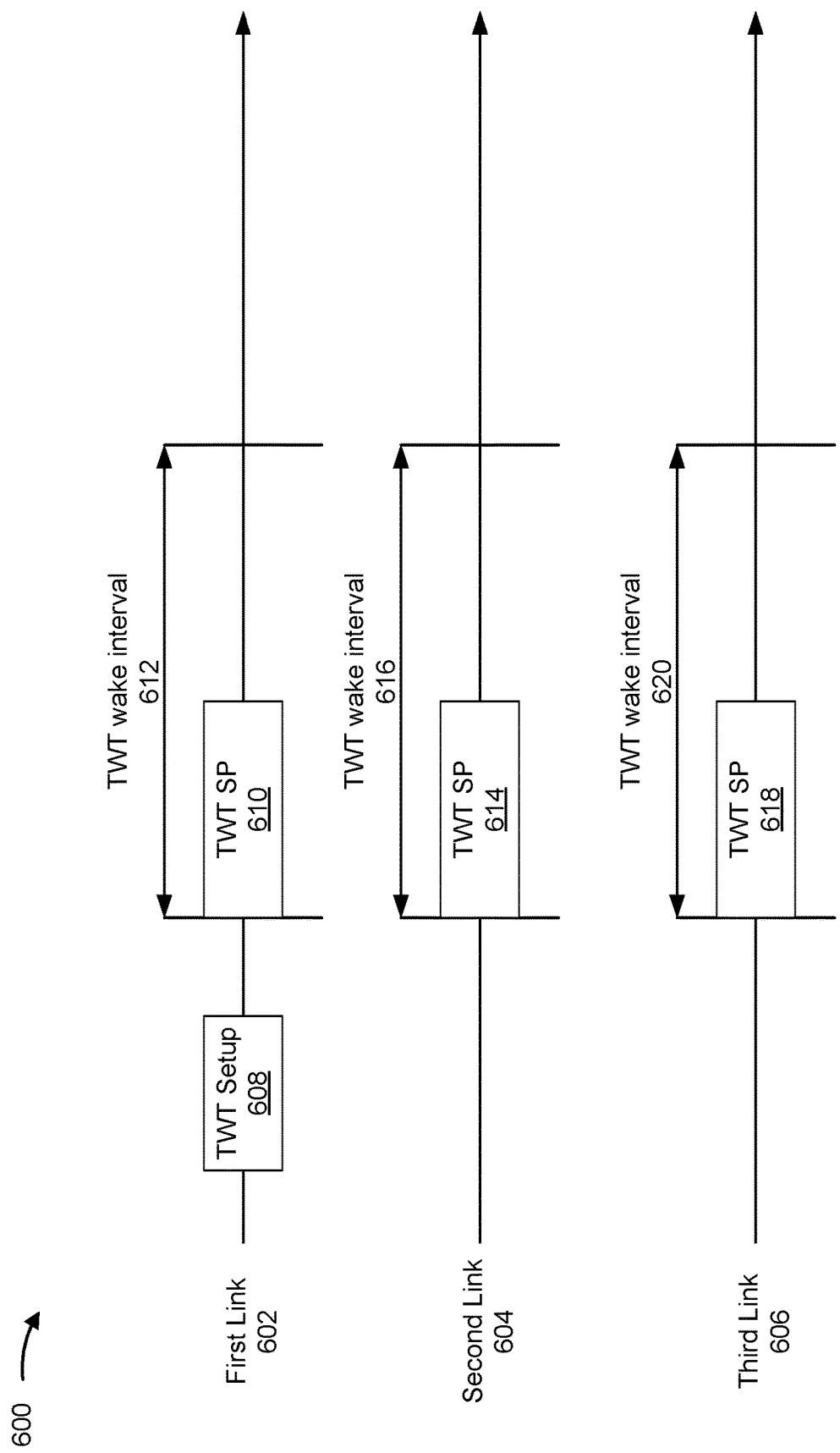
FIG. 6 is an example of a configuration of multi-link communications by MLDs.

FIG. 6 is an example 600 of a configuration of multi-link communications by MLDs. As shown in FIG. 6, an AP MLD multiple links with a non-AP MLD. The multiple links may be associated with different frequency bands.

As shown in FIG. 6, the AP MLD may communicate with the non-AP MLD via a first link 602, a second link 604, and a third link 606. The first link 602 may be associated with a link between a first STA of the non-AP MLD and a first wireless device of the AP MLD. Similarly, the second link 604 may be associated with a link between a second STA of the non-AP MLD and a second wireless device of the AP MLD, and the third link 606 may be associated with a link between a third STA of the non-AP MLD and a third wireless device of the AP MLD.

The non-AP and the AP may perform TWT setup 608. The TWT setup 608 may include a cross-link TWT signaling mechanism to support negotiation of multiple TWT agreements associated with the links 602, 604, and 606. The TWT setup 608 may indicate a request for time alignment among the links 602, 604, and 606.

As shown in FIG. 6, the first link 602 may be configured with a TWT service period (SP) 610 and a TWT wake interval 612. The TWT SP 610 may be configured to begin at a start time of the TWT wake interval 612. Similarly, the second link 604 may be configured with a TWT SP 614 and a TWT wake interval 616, and the third link 606 may be configured with a TWT SP 618 and a TWT wake interval 620.

As shown in FIG. 6, based at least in part on TWT timing of the first link 602, the second link 604, and the third link 606 being aligned, the non-AP MLD and the AP MLD may have active TWT SPs that at least partially overlap. In this way, the first wireless device may conserve power resources that may have otherwise been consumed if the TWT SPs were unaligned (e.g., start times of the TWTs were unaligned).

As indicated above, FIG. 6 is provided as an example. Other examples may differ from what is described with respect to FIG. 6.

Figure 7:
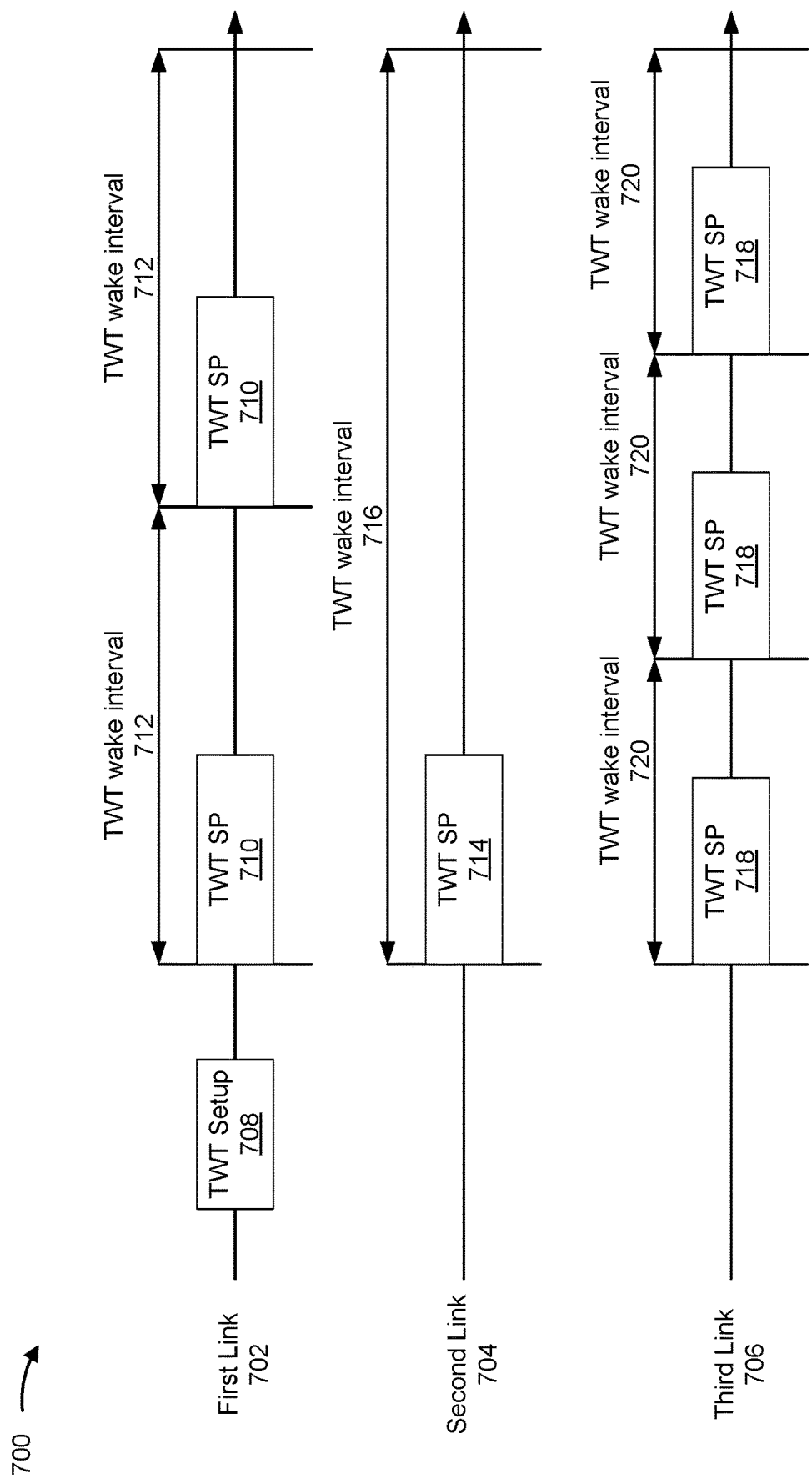
FIG. 7 is an example of a configuration of multi-link communications by MLDs.

FIG. 7 is an example 700 of a configuration of multi-link communications by MLDs. As shown in FIG. 7, an AP MLD multiple links with a non-AP MLD. The multiple links may be associated with different frequency bands.

As shown in FIG. 7, the AP MLD may communicate with the non-AP MLD via a first link 702, a second link 704, and a third link 706. The first link 702 may be associated with a link between a first STA of the non-AP MLD and a first wireless device of the AP MLD. Similarly, the second link 704 may be associated with a link between a second STA of the non-AP MLD and a second wireless device of the AP MLD, and the third link 706 may be associated with a link between a third STA of the non-AP MLD and a third wireless device of the AP MLD.

The non-AP and the AP may perform TWT setup 708. The TWT setup 708 may include a cross-link TWT signaling mechanism to support negotiation of multiple TWT agreements associated with the links 702, 704, and 706. The TWT setup 708 may indicate a request for time alignment among the links 702, 704, and 706.

As shown in FIG. 7, the first link 702 may be configured with a TWT service period (SP) 710 and a TWT wake interval 712. The TWT SP 710 may be configured to begin at a start time of the TWT wake interval 712. Similarly, the second link 704 may be configured with a TWT SP 714 and a TWT wake interval 716, and the third link 706 may be configured with a TWT SP 718 and a TWT wake interval 720.

As shown in FIG. 7, based at least in part on TWT timing of the first link 702, the second link 704, and the third link 706 being aligned, the non-AP MLD and the AP MLD may have active TWT SPs that at least partially overlap periodically. For example, every second TWT SP 710 at least partially overlaps with every TWT SP 714, and with every third TWT SP 718. In this way, the first wireless device may conserve power resources that may have otherwise been consumed if the TWT SPs were unaligned (e.g., start times of the TWTs were unaligned) or that overlapped with a periodicity that is larger than a threshold number of TWT wake intervals (e.g., 4, 8, 10, 12).

As indicated above, FIG. 7 is provided as an example. Other examples may differ from what is described with respect to FIG. 7.

Figure 8:
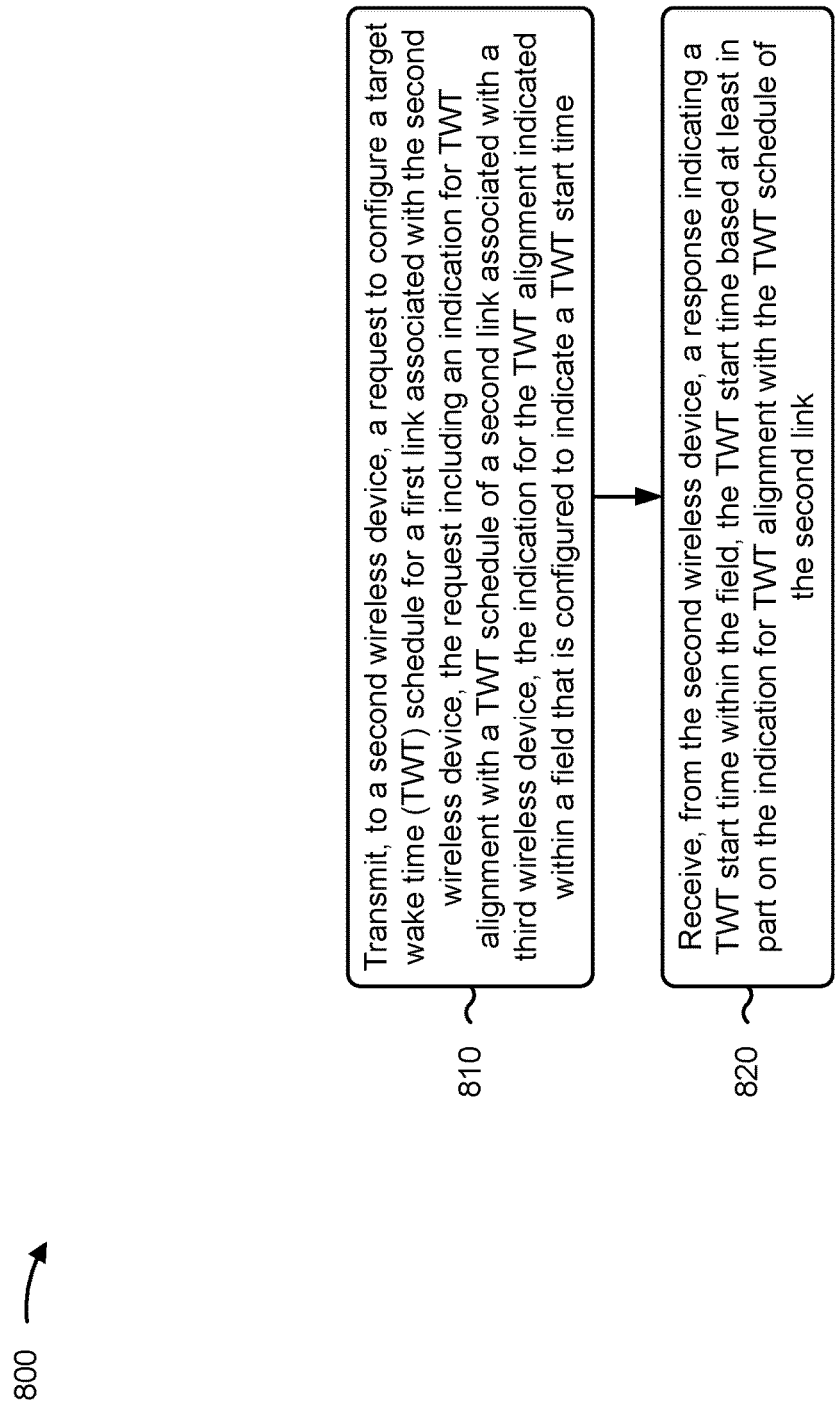
FIG. 8 is a diagram illustrating an example process performed, for example, by a first wireless device, in accordance with the present disclosure.

FIG. 8 is a diagram illustrating an example process 800 performed, for example, by a first wireless device, in accordance with the present disclosure. Example process 800 is an example where the first wireless device (e.g., a first MLD and/or a first STA of a non-AP MLD) performs operations associated with TWT alignment.

As shown in FIG. 8, in some aspects, process 800 may include transmitting, to a second wireless device, a request to configure a TWT schedule for a first link associated with the second wireless device, the request including an indication for TWT alignment with a TWT schedule of a second link associated with a third wireless device, the indication for the TWT alignment indicated within a field that is configured to indicate a TWT start time (block 810). For example, the first wireless device (e.g., using communication manager 1008 and/or transmission component 1004, depicted in FIG. 10) may transmit, to a second wireless device, a request to configure a TWT schedule for a first link associated with the second wireless device, the request including an indication for TWT alignment with a TWT schedule of a second link associated with a third wireless device, the indication for the TWT alignment indicated within a field that is configured to indicate a TWT start time, as described above.

As further shown in FIG. 8, in some aspects, process 800 may include receiving, from the second wireless device, a response indicating a TWT start time within the field, the TWT start time based at least in part on the indication for TWT alignment with the TWT schedule of the second link (block 820). For example, the first wireless device (e.g., using communication manager 1008 and/or reception component 1002, depicted in FIG. 10) may receive, from the second wireless device, a response indicating a TWT start time within the field, the TWT start time based at least in part on the indication for TWT alignment with the TWT schedule of the second link, as described above.

In some aspects, block 810 may be omitted and the first wireless device may communicate based at least in part on receiving the response (e.g., an unsolicited response).

Process 800 may include additional aspects, such as any single aspect or any combination of aspects described below and/or in connection with one or more other processes described elsewhere herein.

In a first aspect, the indication within the field that is configured to indicate the TWT start time comprises one or more of a non-zero value, or an indication of a requested TWT start time for the first link.

In a second aspect, alone or in combination with the first aspect, a difference in time between the requested TWT start time and an additional TWT start time associated with the second link satisfies a threshold.

In a third aspect, alone or in combination with one or more of the first and second aspects, the requested TWT start time for the first link indicates a time in a time domain of the second wireless device.

In a fourth aspect, alone or in combination with one or more of the first through third aspects, absolute time in the time domain of the second wireless device satisfies a threshold relative to an additional TWT start time, associated with the second link, associated with a time in an additional time domain of the third wireless device.

In a fifth aspect, alone or in combination with one or more of the first through fourth aspects, the response indicating the TWT start time within the field indicates one or more of the TWT start time as identified by the second wireless device as satisfying a first threshold relative to an additional TWT start time associated with the second link, the requested TWT start time, or the TWT start time as identified by the second wireless device as satisfying a second threshold relative to the requested TWT start time.

In a sixth aspect, alone or in combination with one or more of the first through fifth aspects, TWT alignment comprises one or more of satisfaction of a first threshold by a first difference in time between the TWT start time and an additional TWT start time associated with the second link, satisfaction of a second threshold by a second difference in time between the TWT start time and a subsequent TWT start time associated with a subsequent TWT period associated with the second link, satisfaction of a third threshold by a third difference in time between a subsequent TWT start time associated with a subsequent TWT period associated with the first link and the additional TWT start time associated with the second link, satisfaction of a fourth threshold by a fourth difference between a first TWT wake interval mantissa and a first exponent field of the first link and a second TWT wake interval mantissa and a second exponent field of the second link, or a time offset between occasions of the TWT start time and occasions of an additional start time associated with the second link.

In a seventh aspect, alone or in combination with one or more of the first through sixth aspects, the time offset is based at least in part on a TWT service period associated with the first TWT schedule.

In an eighth aspect, alone or in combination with one or more of the first through seventh aspects, TWT alignment comprises one or more of satisfaction of a threshold by a first difference in time between a first TWT periodicity of the first link and a second TWT periodicity of the second link, satisfaction of a threshold by a second difference in time between a multiple of the first TWT periodicity of the first link and the second TWT periodicity of the second link, or satisfaction of a threshold by a third difference in time between the first TWT periodicity of the first link and a multiple of the second TWT periodicity of the second link.

In a ninth aspect, alone or in combination with one or more of the first through eighth aspects, process 800 includes identifying an additional TWT start time associated with the second link based at least in part on an indication by the third wireless device or based at least in part on an indication by the second wireless device.

In a tenth aspect, alone or in combination with one or more of the first through ninth aspects, the first link is configured with a first service period duration and the second link is configured with a second service period duration, and the first service period duration is independent from the second service period duration.

In an eleventh aspect, alone or in combination with one or more of the first through tenth aspects, the TWT start time is an absolute time, or the TWT start time is relative to a start-up time or a reference time in a time domain of the second wireless device.

In a twelfth aspect, alone or in combination with one or more of the first through eleventh aspects, the first link is associated with a broadcast TWT.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
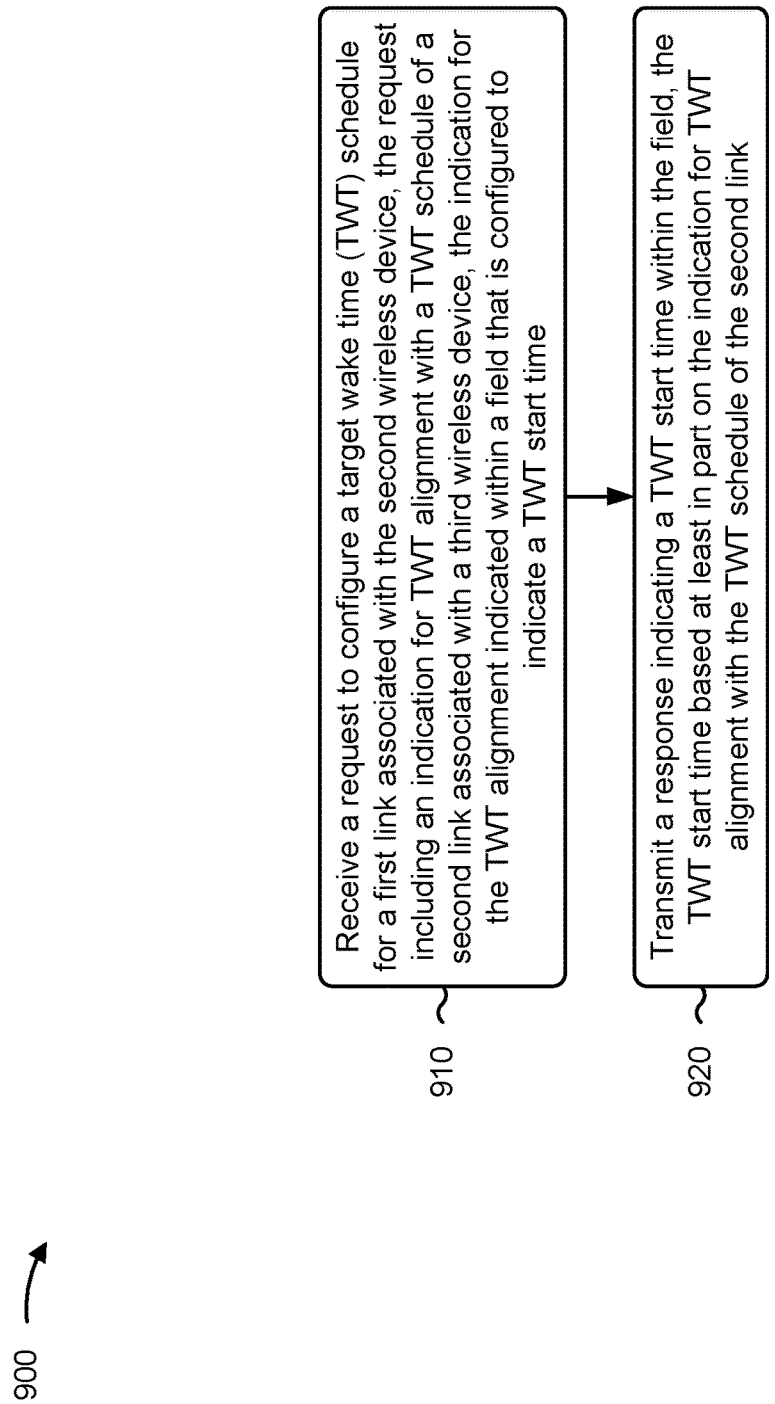
FIG. 9 is a diagram illustrating an example process performed, for example, by a second wireless device, in accordance with the present disclosure.

FIG. 9 is a diagram illustrating an example process 900 performed, for example, by a second wireless device, in accordance with the present disclosure. Example process 900 is an example where the second wireless device (e.g., second MLD, an AP of an AP MLD, among other examples) performs operations associated with TWT alignment.

As shown in FIG. 9, in some aspects, process 900 may include receiving a request to configure a TWT schedule for a first link associated with a first wireless device, the request including an indication for TWT alignment with a TWT schedule of a second link associated with the first wireless device and a third wireless device, the indication for the TWT alignment indicated within a field that is configured to indicate a TWT start time (block 910). For example, the second wireless device (e.g., using communication manager 1108 and/or reception component 1102, depicted in FIG. 11) may receive a request to configure a TWT schedule for a first link associated with a first wireless device, the request including an indication for TWT alignment with a TWT schedule of a second link associated with the first wireless device and a third wireless device, the indication for the TWT alignment indicated within a field that is configured to indicate a TWT start time, as described above.

As further shown in FIG. 9, in some aspects, process 900 may include transmitting a response indicating a TWT start time within the field, the TWT start time based at least in part on the indication for TWT alignment with the TWT schedule of the second link (block 920). For example, the second wireless device (e.g., using communication manager 1108 and/or transmission component 1104, depicted in FIG. 11) may transmit a response indicating a TWT start time within the field, the TWT start time based at least in part on the indication for TWT alignment with the TWT schedule of the second link, as described above.

In some aspects, block 910 may be omitted and the second wireless device may communicate based at least in part on transmitting the response (e.g., an unsolicited response).

Process 900 may include additional aspects, such as any single aspect or any combination of aspects described below and/or in connection with one or more other processes described elsewhere herein.

In a first aspect, the indication within the field that is configured to indicate the TWT start time comprises one or more of a non-zero value, or an indication of a requested TWT start time for the first link.

In a second aspect, alone or in combination with the first aspect, a difference in time between the requested TWT start time and an additional TWT start time associated with the second link satisfies a threshold.

In a third aspect, alone or in combination with one or more of the first and second aspects, the requested TWT start time for the first link indicates a time in a time domain of the second wireless device.

In a fourth aspect, alone or in combination with one or more of the first through third aspects, the time in the time domain of the second wireless device satisfies a threshold relative to an additional TWT start time, associated with the second link, associated with a time in an additional time domain of the third wireless device.

In a fifth aspect, alone or in combination with one or more of the first through fourth aspects, the response indicating the TWT start time within the field indicates one or more of the TWT start time as identified by the second wireless device as satisfying a first threshold relative to an additional TWT start time associated with the second link, the requested TWT start time, or the TWT start time as identified by the second wireless device as satisfying a second threshold relative to the requested TWT start time.

In a sixth aspect, alone or in combination with one or more of the first through fifth aspects, TWT alignment comprises one or more of satisfaction of a first threshold by a first difference in time between the TWT start time and an additional TWT start time associated with the second link, satisfaction of a second threshold by a second difference in time between the TWT start time and a subsequent TWT start time associated with a subsequent TWT period associated with the second link, satisfaction of a third threshold by a third difference in time between a subsequent TWT start time associated with a subsequent TWT period associated with the first link and the additional TWT start time associated with the second link, or satisfaction of a fourth threshold by a fourth difference between a first TWT wake interval mantissa and a first exponent field of the first link and a second TWT wake interval mantissa and a second exponent field of the second link, or a time offset between occasions of the TWT start time and occasions of an additional start time associated with the second link.

In a seventh aspect, alone or in combination with one or more of the first through sixth aspects, the time offset is based at least in part on a TWT service period associated with the first TWT schedule.

In an eighth aspect, alone or in combination with one or more of the first through seventh aspects, TWT alignment comprises one or more of satisfaction of a threshold by a first difference in time between a first TWT periodicity of the first link and a second TWT periodicity of the second link, satisfaction of a threshold by a second difference in time between a multiple of the first TWT periodicity of the first link and the second TWT periodicity of the second link, or satisfaction of a threshold by a third difference in time between the first TWT periodicity of the first link and a multiple of the second TWT periodicity of the second link.

In a ninth aspect, alone or in combination with one or more of the first through eighth aspects, process 900 includes identifying an additional TWT start time associated with the second link based at least in part on the second wireless device and the third wireless device being associated with a same AP multi-link device.

In a tenth aspect, alone or in combination with one or more of the first through ninth aspects, the first link is configured with a first service period duration and the second link is configured with a second service period duration, and the first service period duration is independent from the second service period duration.

In an eleventh aspect, alone or in combination with one or more of the first through tenth aspects, the TWT start time is an absolute time, or the TWT start time is relative to a start-up time or a reference time in a time domain of the second wireless device.

In a twelfth aspect, alone or in combination with one or more of the first through eleventh aspects, the first link is associated with a broadcast TWT.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
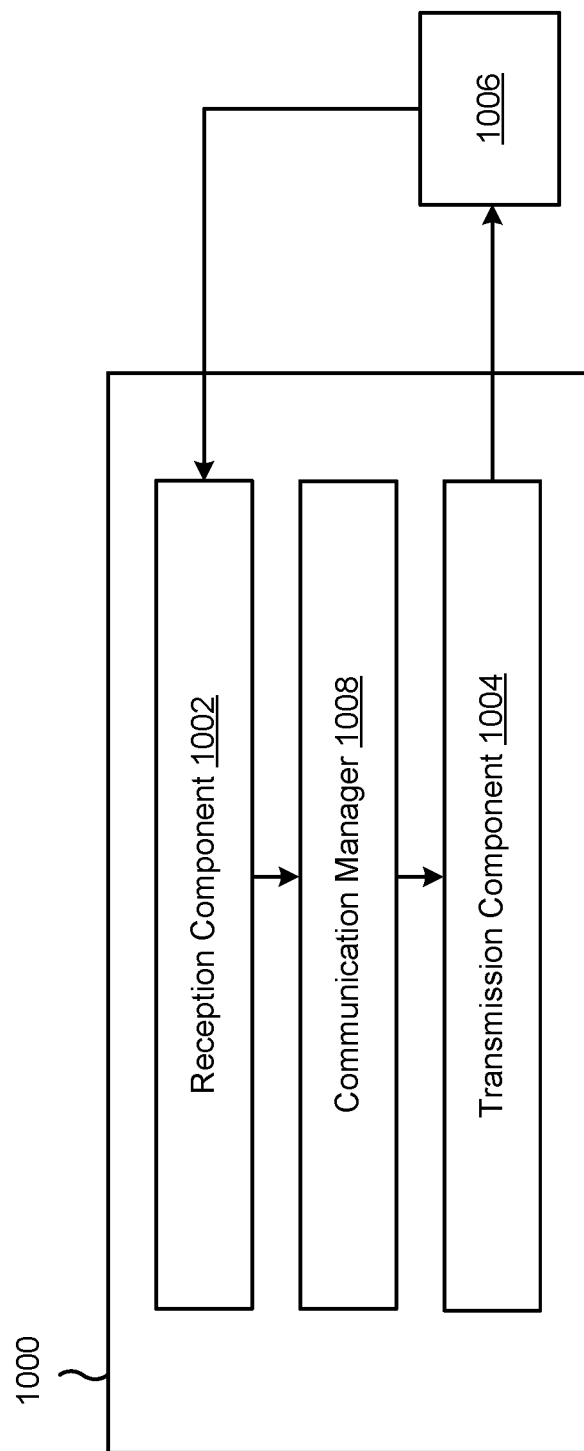
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a first wireless device, or a first wireless device may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a STA, an AP, or another wireless communication device) using the reception component 1002 and the transmission component 1004. As further shown, the apparatus 1000 may include a communication manager 1008.

In some aspects, the apparatus 1000 may be configured to perform one or more operations described herein in connection with FIGS. 5-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the first wireless device described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a multiple-input multiple-output (MIMO) detector, a receive processor, a controller/processor, a memory, or a combination thereof, of the first wireless device described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the first wireless device described in connection with FIG. 2. In some aspects, the transmission component 1004 may be co-located with the reception component 1002 in a transceiver.

The transmission component 1004 may transmit, to a second wireless device, a request to configure a TWT schedule for a first link associated with the second wireless device, the request including an indication for TWT alignment with a TWT schedule of a second link associated with a third wireless device, the indication for the TWT alignment indicated within a field that is configured to indicate a TWT start time. The reception component 1002 may receive, from the second wireless device, a response indicating a TWT start time within the field, the TWT start time based at least in part on the indication for TWT alignment with the TWT schedule of the second link.

The communication manager 1008 may identify an additional TWT start time associated with the second link based at least in part on an indication by the third wireless device or based at least in part on an indication by the second wireless device.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
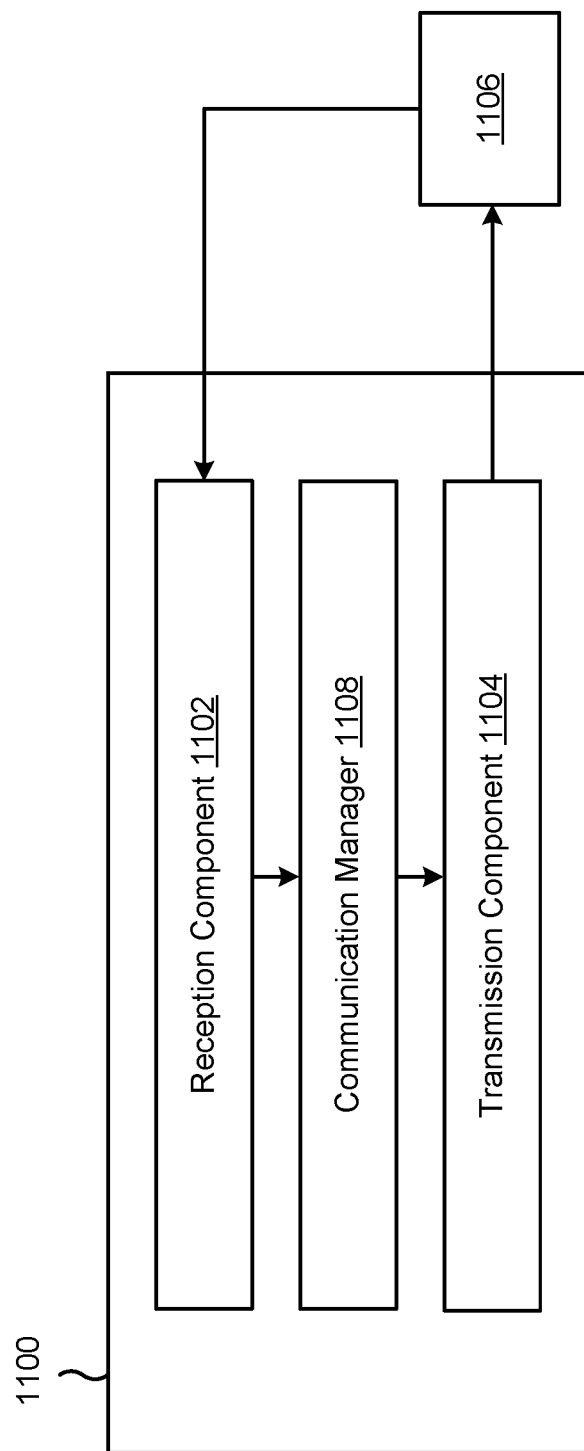
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a second wireless device, or a second wireless device may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a STA, an AP, or another wireless communication device) using the reception component 1102 and the transmission component 1104. As further shown, the apparatus 1100 may include a communication manager 1108

In some aspects, the apparatus 1100 may be configured to perform one or more operations described herein in connection with FIGS. 5-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the second wireless device described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the second wireless device described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the second wireless device described in connection with FIG. 2. In some aspects, the transmission component 1104 may be co-located with the reception component 1102 in a transceiver.

The reception component 1102 may receive a request to configure a TWT schedule for a first link associated with a first wireless device, the request including an indication for TWT alignment with a TWT schedule of a second link associated with the first wireless device and a third wireless device, the indication for the TWT alignment indicated within a field that is configured to indicate a TWT start time. The transmission component 1104 may transmit a response indicating a TWT start time within the field, the TWT start time based at least in part on the indication for TWT alignment with the TWT schedule of the second link.

The communication manager 1108 may identify an additional TWT start time associated with the second link based at least in part on the second wireless device and the third wireless device being associated with a same AP multi-link device.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of a first set of some Aspects of the present disclosure:

Aspect 1: A method of wireless communication performed by a first wireless device, comprising: receiving, from a second wireless device, a response indicating a first TWT start time of a first TWT schedule for a first link associated with the second wireless device, the response further indicating TWT alignment with a second TWT schedule for a second link having a second TWT start time, the indication for the TWT alignment indicated within a field that is configured to indicate a TWT start time; communicating with the second wireless device via the first link based at least in part on the response.

Aspect 2: The method of Aspect 1, wherein the response comprises one or more of: an individually addressed unsolicited response, a broadcast response, or a solicited response based at least in part on reception of a request to configure a TWT schedule for the first link.

Aspect 3: The method of any of Aspects 1-2, wherein communicating with the second wireless device via the first link based at least in part on the response comprises one or more of: communicating using the first TWT start time in the first link; communicating using the second TWT start time in the second link; or initiating a TWT teardown of one or more of the first TWT schedule or the second TWT schedule.

Aspect 4: The method of any of Aspects 1-3, wherein the indication within the field that is configured to indicate the TWT start time comprises one or more of: a non-zero value, or an indication of a requested TWT start time for the first link.

Aspect 5: The method of Aspect 4, wherein a difference in time between the requested TWT start time and the second TWT start time associated with the second link satisfies a threshold.

Aspect 6: The method of Aspect 4, wherein the requested TWT start time for the first link indicates a time in a time domain of the second wireless device.

Aspect 7: The method of Aspect 6, wherein the time in the time domain of the second wireless device satisfies a threshold relative to an additional TWT start time, associated with the second link, associated with a time in an additional time domain of a third wireless device.

Aspect 8: The method of Aspect 4, wherein the response indicating the first TWT start time within the field indicates one or more of: the first TWT start time as identified by the second wireless device as satisfying a first threshold relative to the second TWT start time associated with the second link, the requested TWT start time, or the first TWT start time as identified by the second wireless device as satisfying a second threshold relative to the requested TWT start time.

Aspect 9: The method of any of Aspects 1-8, wherein TWT alignment comprises one or more of: satisfaction of a first threshold by a first difference in time between the first TWT start time and the second TWT start time, satisfaction of a second threshold by a second difference in time between the first TWT start time and a subsequent TWT start time associated with a subsequent TWT period associated with the second link, satisfaction of a third threshold by a third difference in time between a subsequent TWT start time associated with a subsequent TWT period associated with the first link and the second TWT start time associated with the second link, satisfaction of a fourth threshold by a fourth difference between a first TWT wake interval mantissa and a first exponent field of the first link and a second TWT wake interval mantissa and a second exponent field of the second link, or a time offset between occasions of the first TWT start time and occasions of the second TWT start time associated with the second link.

Aspect 10: The method of Aspect 9, wherein the time offset is based at least in part on a TWT service period associated with the first TWT schedule.

Aspect 11: The method of any of Aspects 1-10, wherein TWT alignment comprises one or more of: satisfaction of a threshold by a first difference in time between a first TWT periodicity of the first link and a second TWT periodicity of the second link, satisfaction of a threshold by a second difference in time between a multiple of the first TWT periodicity of the first link and the second TWT periodicity of the second link, or satisfaction of a threshold by a third difference in time between the first TWT periodicity of the first link and a multiple of the second TWT periodicity of the second link.

Aspect 12: The method of any of Aspects 1-11, wherein the first link is configured with a first service period duration and the second link is configured with a second service period duration, and wherein the first service period duration is independent from the second service period duration.

Aspect 13: The method of any of Aspects 1-12, wherein the first TWT start time is an absolute time, or wherein the first TWT start time is relative to a start-up time or a reference time in a time domain of the second wireless device.

Aspect 14: A method of wireless communication performed by a second wireless device, comprising: transmitting, to a first wireless device, a response indicating a first TWT start time of a first TWT schedule for a first link associated with the first wireless device, the response further indicating TWT alignment with a second TWT schedule for a second link having a second TWT start time, the indication for the TWT alignment indicated within a field that is configured to indicate a TWT start time; and communicating with the first wireless device via the first link based at least in part on the response.

Aspect 15: The method of Aspect 14, wherein the response comprises one or more of: an individually addressed unsolicited response, a broadcast response, or a solicited response based at least in part on reception of a request to configure a TWT schedule for the first link.

Aspect 16: The method of any of Aspects 14-15, wherein communicating with the second wireless device via the first link based at least in part on the response comprises one or more of: communicating using the first TWT start time in the first link; communicating using the second TWT start time in the second link; or initiating a TWT teardown of one or more of the first TWT schedule or the second TWT schedule.

Aspect 17: The method of any of Aspects 14-16, wherein the indication within the field that is configured to indicate the TWT start time comprises one or more of: a non-zero value, or an indication of a requested TWT start time for the first link.

Aspect 18: The method of Aspect 17, wherein a difference in time between the requested TWT start time and the second TWT start time associated with the second link satisfies a threshold.

Aspect 19: The method of Aspect 17, wherein the requested TWT start time for the first link indicates a time in a time domain of the second wireless device.

Aspect 20: The method of Aspect 19, wherein the time in the time domain of the second wireless device satisfies a threshold relative to an additional TWT start time, associated with the second link, associated with a time in an additional time domain of a third wireless device.

Aspect 21: The method of Aspect 17, wherein the response indicating the first TWT start time within the field indicates one or more of: the first TWT start time as identified by the second wireless device as satisfying a first threshold relative to the second TWT start time associated with the second link, the requested TWT start time, or the first TWT start time as identified by the second wireless device as satisfying a second threshold relative to the requested TWT start time.

Aspect 22: The method of any of Aspects 14-21, wherein TWT alignment comprises one or more of: satisfaction of a first threshold by a first difference in time between the first TWT start time and the second TWT start time, satisfaction of a second threshold by a second difference in time between the first TWT start time and a subsequent TWT start time associated with a subsequent TWT period associated with the second link, satisfaction of a third threshold by a third difference in time between a subsequent TWT start time associated with a subsequent TWT period associated with the first link and the second TWT start time associated with the second link, or satisfaction of a fourth threshold by a fourth difference between a first TWT wake interval mantissa and a first exponent field of the first link and a second TWT wake interval mantissa and a second exponent field of the second link, or a time offset between occasions of the first TWT start time and occasions of the second TWT start time associated with the second link.

Aspect 23: The method of Aspect 22, wherein the time offset is based at least in part on a TWT service period associated with the first TWT schedule.

Aspect 24: The method of any of Aspects 14-23, wherein TWT alignment comprises one or more of: satisfaction of a threshold by a first difference in time between a first TWT periodicity of the first link and a second TWT periodicity of the second link, satisfaction of a threshold by a second difference in time between a multiple of the first TWT periodicity of the first link and the second TWT periodicity of the second link, or satisfaction of a threshold by a third difference in time between the first TWT periodicity of the first link and a multiple of the second TWT periodicity of the second link.

Aspect 25: The method of any of Aspects 14-24, wherein the first link is configured with a first service period duration and the second link is configured with a second service period duration, and wherein the first service period duration is independent from the second service period duration.

Aspect 26: The method of any of Aspects 14-25, wherein the first TWT start time is an absolute time, or wherein the first TWT start time is relative to a start-up time or a reference time in a time domain of the second wireless device.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The following provides an overview of a second set of some Aspects of the present disclosure:

The following provides an overview of some Aspects of the present disclosure:

Aspect 1: A method of wireless communication performed by a first wireless device, comprising: receiving, from a second wireless device, a response indicating a first target wake time (TWT) start time of a first TWT schedule for a first link associated with the second wireless device, the response further indicating TWT alignment with a second TWT schedule for a second link having a second TWT start time, the indication for the TWT alignment indicated within a field that is configured to indicate a TWT start time; and communicating with the second wireless device via the first link based at least in part on the response.

Aspect 2: The method of Aspect 1, wherein the response comprises one or more of: an individually addressed unsolicited response, a broadcast response, or a solicited response based at least in part on reception of a request to configure a TWT schedule for the first link.

Aspect 3: The method of any of Aspects 1-2, wherein communicating with the second wireless device via the first link based at least in part on the response comprises one or more of: communicating using the first TWT start time in the first link; communicating using the second TWT start time in the second link; or initiating a TWT teardown of one or more of the first TWT schedule or the second TWT schedule.

Aspect 4: The method of any of Aspects 1-3, wherein the indication within the field that is configured to indicate the TWT start time comprises one or more of: a non-zero value, or an indication of a requested TWT start time for the first link.

Aspect 5: The method of Aspect 4, wherein a difference in time between the requested TWT start time and the second TWT start time associated with the second link satisfies a threshold.

Aspect 6: The method of Aspect 4, wherein the requested TWT start time for the first link indicates a time in a time domain of the second wireless device.

Aspect 7: The method of Aspect 6, wherein the time in the time domain of the second wireless device satisfies a threshold relative to an additional TWT start time, associated with the second link, associated with a time in an additional time domain of a third wireless device.

Aspect 8: The method of Aspect 4, wherein the response indicating the first TWT start time within the field indicates one or more of: the first TWT start time as identified by the second wireless device as satisfying a first threshold relative to the second TWT start time associated with the second link, the requested TWT start time, or the first TWT start time as identified by the second wireless device as satisfying a second threshold relative to the requested TWT start time.

Aspect 9: The method of any of Aspects 1-8, wherein the TWT alignment comprises one or more of: satisfaction of a first threshold by a first difference in time between the first TWT start time and the second TWT start time, satisfaction of a second threshold by a second difference in time between the first TWT start time and a subsequent TWT start time associated with a subsequent TWT period associated with the second link, satisfaction of a third threshold by a third difference in time between a subsequent TWT start time associated with a subsequent TWT period associated with the first link and the second TWT start time associated with the second link, satisfaction of a fourth threshold by a fourth difference between a first TWT wake interval mantissa and a first exponent field of the first link and a second TWT wake interval mantissa and a second exponent field of the second link, or a time offset between occasions of the first TWT start time and occasions of the second TWT start time associated with the second link.

Aspect 10: The method of Aspect 9, wherein the time offset is based at least in part on a TWT service period associated with the first TWT schedule.

Aspect 11: The method of any of Aspects 1-10, wherein TWT alignment comprises one or more of: satisfaction of a threshold by a first difference in time between a first TWT periodicity of the first link and a second TWT periodicity of the second link, satisfaction of a threshold by a second difference in time between a multiple of the first TWT periodicity of the first link and the second TWT periodicity of the second link, or satisfaction of a threshold by a third difference in time between the first TWT periodicity of the first link and a multiple of the second TWT periodicity of the second link.

Aspect 12: The method of any of Aspects 1-11, wherein the first link is configured with a first service period duration and the second link is configured with a second service period duration, and wherein the first service period duration is independent from the second service period duration.

Aspect 13: The method of any of Aspects 1-12, wherein the first TWT start time is an absolute time, or wherein the first TWT start time is relative to a start-up time or a reference time in a time domain of the second wireless device.

Aspect 14: A method of wireless communication performed by a second wireless device, comprising: transmitting, to a first wireless device, a response indicating a first target wake time (TWT) start time of a first TWT schedule for a first link associated with the first wireless device, the response further indicating TWT alignment with a second TWT schedule for a second link having a second TWT start time, the indication for the TWT alignment indicated within a field that is configured to indicate a TWT start time; and communicating with the first wireless device via the first link based at least in part on the response.

Aspect 15: The method of Aspect 14, wherein the response comprises one or more of: an individually addressed unsolicited response, a broadcast response, or a solicited response based at least in part on reception of a request to configure a TWT schedule for the first link.

Aspect 16: The method of any of Aspects 14-15, wherein communicating with the second wireless device via the first link based at least in part on the response comprises one or more of: communicating using the first TWT start time in the first link; communicating using the second TWT start time in the second link; or initiating a TWT teardown of one or more of the first TWT schedule or the second TWT schedule.

Aspect 17: The method of any of Aspects 14-16, wherein the indication within the field that is configured to indicate the TWT start time comprises one or more of: a non-zero value, or an indication of a requested TWT start time for the first link.

Aspect 18: The method of Aspect 17, wherein a difference in time between the requested TWT start time and the second TWT start time associated with the second link satisfies a threshold.

Aspect 19: The method of Aspect 17, wherein the requested TWT start time for the first link indicates a time in a time domain of the second wireless device.

Aspect 20: The method of Aspect 19, wherein the time in the time domain of the second wireless device satisfies a threshold relative to an additional TWT start time, associated with the second link, associated with a time in an additional time domain of a third wireless device.

Aspect 21: The method of Aspect 17, wherein the response indicating the first TWT start time within the field indicates one or more of: the first TWT start time as identified by the second wireless device as satisfying a first threshold relative to the second TWT start time associated with the second link, the requested TWT start time, or the first TWT start time as identified by the second wireless device as satisfying a second threshold relative to the requested TWT start time.

Aspect 22: The method of any of Aspects 14-21, wherein the TWT alignment comprises one or more of: satisfaction of a first threshold by a first difference in time between the first TWT start time and the second TWT start time, satisfaction of a second threshold by a second difference in time between the first TWT start time and a subsequent TWT start time associated with a subsequent TWT period associated with the second link, satisfaction of a third threshold by a third difference in time between a subsequent TWT start time associated with a subsequent TWT period associated with the first link and the second TWT start time associated with the second link, satisfaction of a fourth threshold by a fourth difference between a first TWT wake interval mantissa and a first exponent field of the first link and a second TWT wake interval mantissa and a second exponent field of the second link, or a time offset between occasions of the first TWT start time and occasions of the second TWT start time associated with the second link.

Aspect 23: The method of Aspect 22, wherein the time offset is based at least in part on a TWT service period associated with the first TWT schedule.

Aspect 24: The method of any of Aspects 14-23, wherein the TWT alignment comprises one or more of: satisfaction of a threshold by a first difference in time between a first TWT periodicity of the first link and a second TWT periodicity of the second link, satisfaction of a threshold by a second difference in time between a multiple of the first TWT periodicity of the first link and the second TWT periodicity of the second link, or satisfaction of a threshold by a third difference in time between the first TWT periodicity of the first link and a multiple of the second TWT periodicity of the second link.

Aspect 25: The method of any of Aspects 14-24, wherein the first link is configured with a first service period duration and the second link is configured with a second service period duration, and wherein the first service period duration is independent from the second service period duration.

Aspect 26: The method of any of Aspects 14-25, wherein the first TWT start time is an absolute time, or wherein the first TWT start time is relative to a start-up time or a reference time in a time domain of the second wireless device.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first wireless device for wireless communication, comprising:
    a memory; and
    one or more processors, coupled to the memory, configured to:
        receive, from a second wireless device, a response indicating a first target wake time (TWT) start time of a first TWT schedule for a first link associated with the second wireless device, the response further indicating TWT alignment with a second TWT schedule for a second link having a second TWT start time, wherein a first TWT wake interval corresponding to the first TWT schedule and a second TWT wake interval corresponding to the second TWT schedule are multiples of a common denominator; and
        communicate with the second wireless device via the first link based at least in part on the response.

2. The first wireless device of claim 1,
wherein the response comprises one or more of:
    an individually addressed unsolicited response,
    a broadcast response, or
    a solicited response based at least in part on reception of a request to configure a TWT schedule for the first link.

3. The first wireless device of claim 1,
wherein the one or more processors, to communicate with the second wireless device via the first link based at least in part on the response, are configured to:
    communicate using the first TWT start time in the first link;
    communicate using the second TWT start time in the second link; or
    initiate a TWT teardown of one or more of the first TWT schedule or the second TWT schedule.

4. The first wireless device of claim 1,
wherein the indication for the TWT alignment is indicated within a field that is configured to indicate a TWT start time, and wherein the indication within the field comprises one or more of:
    a non-zero value, or
    an indication of a requested TWT start time for the first link.

5. The first wireless device of claim 4,
wherein a difference in time between the requested TWT start time and the second TWT start time associated with the second link satisfies a threshold.

6. The first wireless device of claim 4,
wherein the requested TWT start time for the first link indicates a time in a time domain of the second wireless device.

7. The first wireless device of claim 6,
wherein the time in the time domain of the second wireless device satisfies a threshold relative to an additional TWT start time, associated with the second link, associated with a time in an additional time domain of a third wireless device.

8. The first wireless device of claim 4,
wherein the response indicating the first TWT start time within the field indicates one or more of:
    the first TWT start time as identified by the second wireless device as satisfying a first threshold relative to the second TWT start time associated with the second link,
    the requested TWT start time, or
    the first TWT start time as identified by the second wireless device as satisfying a second threshold relative to the requested TWT start time.

9. The first wireless device of claim 1,
wherein the TWT alignment comprises one or more of:
    satisfaction of a first threshold by a first difference in time between the first TWT start time and the second TWT start time,
    satisfaction of a second threshold by a second difference in time between the first TWT start time and a subsequent TWT start time associated with a subsequent TWT period associated with the second link,
    satisfaction of a third threshold by a third difference in time between a subsequent TWT start time associated with a subsequent TWT period associated with the first link and the second TWT start time associated with the second link,
    satisfaction of a fourth threshold by a fourth difference between a first TWT wake interval mantissa and a first exponent field of the first link and a second TWT wake interval mantissa and a second exponent field of the second link, or
    a time offset between occasions of the first TWT start time and occasions of the second TWT start time associated with the second link.

10. The first wireless device of claim 9,
wherein the time offset is based at least in part on a TWT service period associated with the first TWT schedule.

11. The first wireless device of claim 1,
wherein TWT alignment comprises one or more of:
    satisfaction of a threshold by a first difference in time between a first TWT periodicity of the first link and a second TWT periodicity of the second link,
    satisfaction of a threshold by a second difference in time between a multiple of the first TWT periodicity of the first link and the second TWT periodicity of the second link, or
    satisfaction of a threshold by a third difference in time between the first TWT periodicity of the first link and a multiple of the second TWT periodicity of the second link.

12. The first wireless device of claim 1,
wherein the first link is configured with a first service period duration and the second link is configured with a second service period duration, and
    wherein the first service period duration is independent from the second service period duration.

13. The first wireless device of claim 1,
wherein the first TWT start time is an absolute time, or wherein the first TWT start time is relative to a start-up time or a reference time in a time domain of the second wireless device.

14. A second wireless device for wireless communication, comprising:
a memory; and
one or more processors, coupled to the memory, configured to:
transmit, to a first wireless device, a response indicating a first target wake time (TWT) start time of a first TWT schedule for a first link associated with the first wireless device, the response further indicating TWT alignment with a second TWT schedule for a second link having a second TWT start time, wherein a first TWT wake interval corresponding to the first TWT schedule and a second TWT wake interval corresponding to the second TWT schedule are multiples of a common denominator; and
communicate with the first wireless device via the first link based at least in part on the response.

15. The second wireless device of claim 14,
wherein the response comprises one or more of:
an individually addressed unsolicited response,
a broadcast response, or
a solicited response based at least in part on reception of a request to configure a TWT schedule for the first link.

16. The second wireless device of claim 14,
wherein the one or more processors, to communicate with the second wireless device via the first link based at least in part on the response, are configured to:
communicate using the first TWT start time in the first link;
communicate using the second TWT start time in the second link; or
initiate a TWT teardown of one or more of the first TWT schedule or the second TWT schedule.

17. The second wireless device of claim 14,
wherein the indication for the TWT alignment is indicated within a field that is configured to indicate a TWT start time, and wherein the indication within the field that is configured to indicate the TWT start time comprises one or more of:
a non-zero value, or
an indication of a requested TWT start time for the first link.

18. The second wireless device of claim 17,
wherein a difference in time between the requested TWT start time and the second TWT start time associated with the second link satisfies a threshold.

19. The second wireless device of claim 17,
wherein the requested TWT start time for the first link indicates a time in a time domain of the second wireless device.

20. The second wireless device of claim 19,
wherein the time in the time domain of the second wireless device satisfies a threshold relative to an additional TWT start time, associated with the second link, associated with a time in an additional time domain of a third wireless device.

21. The second wireless device of claim 17,
wherein the response indicating the first TWT start time within the field indicates one or more of:
the first TWT start time as identified by the second wireless device as satisfying a first threshold relative to the second TWT start time associated with the second link,
the requested TWT start time, or
the first TWT start time as identified by the second wireless device as satisfying a second threshold relative to the requested TWT start time.

22. The second wireless device of claim 14,
wherein the TWT alignment comprises one or more of:
satisfaction of a first threshold by a first difference in time between the first TWT start time and the second TWT start time,
satisfaction of a second threshold by a second difference in time between the first TWT start time and a subsequent TWT start time associated with a subsequent TWT period associated with the second link,
satisfaction of a third threshold by a third difference in time between a subsequent TWT start time associated with a subsequent TWT period associated with the first link and the second TWT start time associated with the second link,
satisfaction of a fourth threshold by a fourth difference between a first TWT wake interval mantissa and a first exponent field of the first link and a second TWT wake interval mantissa and a second exponent field of the second link, or
a time offset between occasions of the first TWT start time and occasions of the second TWT start time associated with the second link.

23. The second wireless device of claim 22,
wherein the time offset is based at least in part on a TWT service period associated with the first TWT schedule.

24. The second wireless device of claim 14,
wherein the TWT alignment comprises one or more of:
satisfaction of a threshold by a first difference in time between a first TWT periodicity of the first link and a second TWT periodicity of the second link,
satisfaction of a threshold by a second difference in time between a multiple of the first TWT periodicity of the first link and the second TWT periodicity of the second link, or
satisfaction of a threshold by a third difference in time between the first TWT periodicity of the first link and a multiple of the second TWT periodicity of the second link.

25. The second wireless device of claim 14,
wherein the first link is configured with a first service period duration and the second link is configured with a second service period duration, and
wherein the first service period duration is independent from the second service period duration.

26. The second wireless device of claim 14,
wherein the first TWT start time is an absolute time, or
wherein the first TWT start time is relative to a start-up time or a reference time in a time domain of the second wireless device.

27. A method of wireless communication performed by a first wireless device, comprising:
receiving, from a second wireless device, a response indicating a first target wake time (TWT) start time of a first TWT schedule for a first link associated with the second wireless device, the response further indicating TWT alignment with a second TWT schedule for a second link having a second TWT start time, wherein a first TWT wake interval corresponding to the first TWT schedule and a second TWT wake interval corresponding to the second TWT schedule are multiples of a common denominator; and
communicating with the second wireless device via the first link based at least in part on the response.

28. The method of claim 27,
wherein the TWT alignment comprises one or more of:
- satisfaction of a first threshold by a first difference in time between the first TWT start time and the second TWT start time,
- satisfaction of a second threshold by a second difference in time between the first TWT start time and a subsequent TWT start time associated with a subsequent TWT period associated with the second link,
- satisfaction of a third threshold by a third difference in time between a subsequent TWT start time associated with a subsequent TWT period associated with the first link and the second TWT start time associated with the second link,
- satisfaction of a fourth threshold by a fourth difference between a first TWT wake interval mantissa and a first exponent field of the first link and a second TWT wake interval mantissa and a second exponent field of the second link, or
- a time offset between occasions of the first TWT start time and occasions of the second TWT start time associated with the second link.

29. A method of wireless communication performed by a second wireless device, comprising:
- transmitting, to a first wireless device, a response indicating a first target wake time (TWT) start time of a first TWT schedule for a first link associated with the first wireless device, the response further indicating TWT alignment with a second TWT schedule for a second link having a second TWT start time, wherein a first TWT wake interval corresponding to the first TWT schedule and a second TWT wake interval corresponding to the second TWT schedule are multiples of a common denominator; and
- communicating with the first wireless device via the first link based at least in part on the response.

30. The method of claim 29,
wherein the TWT alignment comprises one or more of:
- satisfaction of a first threshold by a first difference in time between the first TWT start time and the second TWT start time,
- satisfaction of a second threshold by a second difference in time between the first TWT start time and a subsequent TWT start time associated with a subsequent TWT period associated with the second link,
- satisfaction of a third threshold by a third difference in time between a subsequent TWT start time associated with a subsequent TWT period associated with the first link and the second TWT start time associated with the second link,
- satisfaction of a fourth threshold by a fourth difference between a first TWT wake interval mantissa and a first exponent field of the first link and a second TWT wake interval mantissa and a second exponent field of the second link, or
- a time offset between occasions of the first TWT start time and occasions of the second TWT start time associated with the second link.

* * * * *